US010585620B2

(12) United States Patent
Nikaido et al.

(10) Patent No.: US 10,585,620 B2
(45) Date of Patent: Mar. 10, 2020

(54) STORAGE MONITORING SYSTEM FOR MONITORING COMPONENTS IN A STORAGE SYSTEM IN A DISTRIBUTED MANNER

(71) Applicant: Hitachi, Ltd., Tokyo (JP)

(72) Inventors: Akira Nikaido, Tokyo (JP); Takaki Kuroda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 253 days.

(21) Appl. No.: 15/551,249

(22) PCT Filed: Jul. 28, 2015

(86) PCT No.: PCT/JP2015/071298
§ 371 (c)(1),
(2) Date: Aug. 15, 2017

(87) PCT Pub. No.: WO2017/017774
PCT Pub. Date: Feb. 2, 2017

(65) Prior Publication Data
US 2018/0018129 A1   Jan. 18, 2018

(51) Int. Cl.
*G06F 3/06* (2006.01)
*G06F 13/00* (2006.01)
(Continued)

(52) U.S. Cl.
CPC .......... *G06F 3/0653* (2013.01); *G06F 3/0604* (2013.01); *G06F 3/067* (2013.01);
(Continued)

(58) Field of Classification Search
CPC ...... G06F 3/0653; G06F 3/0604; G06F 3/067; G06F 3/0626; G06F 11/3006;
(Continued)

(56) References Cited

U.S. PATENT DOCUMENTS 7,469,284 B1   12/2008 Dubrovsky et al.
9,231,858 B1 *  1/2016 Greifeneder ............ H04L 45/24
(Continued)

FOREIGN PATENT DOCUMENTS

JP   2003-051822 A    2/2003
JP   2011-090639 A    5/2011
JP   2011-197775 A   10/2011

OTHER PUBLICATIONS

International Search Report and Written Opinion for PCT App No. PCT/JP2015/071298 dated Oct. 20, 2015, 10 pgs.

*Primary Examiner* — Michael Krofcheck
(74) *Attorney, Agent, or Firm* — Procopio, Cory, Hargreaves & Savitch LLP

(57) ABSTRACT

A method for a storage monitoring system including a storage device, a manager, and agents, wherein said manager: stores information about a first range of components of a first type that are among types of components included in the storage device, and that are to be monitored by a first agent of the agents, said stored information being associated with information about the first agent; notifies the first agent of the information about the first range of components to be monitored; stores information about a second range of components of the first type that are among the types of components, and that are to be monitored by a second agent of the agents, said stored information being associated with information about the second agent; and notifies the second agent of the information about the second range of components to be monitored.

7 Claims, 21 Drawing Sheets

(51) Int. Cl.
  *G06F 11/34* (2006.01)
  *G06F 11/30* (2006.01)
(52) U.S. Cl.
  CPC ...... *G06F 11/3006* (2013.01); *G06F 11/3024* (2013.01); *G06F 11/3433* (2013.01); *G06F 11/3452* (2013.01); *G06F 13/00* (2013.01)
(58) Field of Classification Search
  CPC ............. G06F 11/3024; G06F 11/3433; G06F 11/3452; G06F 11/3003; G06F 11/3034; G06F 11/3037; G06F 11/34; G06F 11/3423; G06F 11/3409; G06F 13/00
  See application file for complete search history.

(56) References Cited

U.S. PATENT DOCUMENTS

| | | | | |
|---|---|---|---|---|
| 2005/0033871 | A1* | 2/2005 | Beg | G06F 11/3409 710/15 |
| 2005/0198298 | A1* | 9/2005 | Nishikawa | G06F 11/3409 709/226 |
| 2005/0237947 | A1* | 10/2005 | Ando | H04L 41/0896 370/254 |
| 2007/0179995 | A1* | 8/2007 | Prahlad | G06F 16/24575 |
| 2008/0295095 | A1* | 11/2008 | Watanabe | G06F 11/0712 718/1 |
| 2010/0235599 | A1* | 9/2010 | Akagawa | G06F 3/0605 711/163 |
| 2011/0099268 | A1 | 4/2011 | Ozaki et al. | |
| 2012/0265935 | A1* | 10/2012 | Luo | G06F 3/0607 711/114 |
| 2012/0317358 | A1* | 12/2012 | Ando | G06F 3/0605 711/117 |
| 2014/0189682 | A1* | 7/2014 | Crudele | G06F 9/45558 718/1 |
| 2015/0113338 | A1* | 4/2015 | Maruyama | G06F 11/3037 714/48 |
| 2015/0134929 | A1* | 5/2015 | Anderson | G06F 3/067 711/170 |

* cited by examiner

| STORAGE ID | SERIAL NO. | MODEL | NUM. OF VOLUMES | TIME OF UPDATE |
|---|---|---|---|---|
| StorageA | 000001 | R800 | 20000 | 2015/1/26 10:13:34 |
| StorageB | 000002 | DF800 | 3000 | 2015/1/23 15:3:52 |
| StorageC | 000003 | R700 | 12000 | 2015/1/11 22:33:4 |
| StorageD | 000004 | R600 | 6000 | 2015/1/17 8:18:47 |
| StorageE | 000005 | HM800 | 8000 | 2015/1/26 10:13:34 |

FIG. 8A

| VOLUME ID | STORAGE ID | CAPACITY | ASSIGNED CAPACITY | TIME OF UPDATE |
|---|---|---|---|---|
| Volume1 | StorageA | 500GB | 20GB | 2015/1/26 10:13:34 |
| Volume2 | StorageB | 200GB | 80GB | 2015/1/23 15:3:52 |
| Volume3 | StorageC | 300GB | 150GB | 2015/1/11 22:33:4 |
| Volume4 | StorageD | 1TB | 800GB | 2015/1/17 8:18:47 |
| Volume5 | StorageE | 2TB | 1.2TB | 2015/1/26 10:13:34 |
| ... | ... | ... | ... | ... |
| Volume10000 | StorageA | 4TB | 2.2TB | 2015/1/16 15:56:24 |

FIG. 8B

| CPU ID | STORAGE ID | TIME OF UPDATE |
|---|---|---|
| MPB1 | StorageA | 2015/1/26 10:13:34 |
| MPB2 | StorageB | 2015/1/23 15:3:52 |
| MPB3 | StorageC | 2015/1/11 22:33:4 |
| ... | ... | ... |
| MPB32 | StorageD | 2015/1/13 7:22:50 |

FIG. 8C

| PORT ID | STORAGE ID | TIME OF UPDATE |
|---|---|---|
| Port1 | StorageA | 2015/1/26 10:13:34 |
| Port2 | StorageB | 2015/1/23 15:3:52 |
| Port3 | StorageC | 2015/1/21 5:34:22 |
| ... | ... | ... |
| Port100 | StorageD | 2015/1/17 8:18:47 |

FIG. 9

| STORAGE ID ~900 | PRIMARY ~901 | PORT ID ~902 | VOLUME ID ~903 | PERIOD ~904 | AGENT ID ~905 |
|---|---|---|---|---|---|
| StorageA | Y | Port 1-50 | Volume 1-10000 | 2014/10/1- 2014/12/31 | Agent1 |
| StorageA | - | Port 51-100 | Volume 10001-20000 | 2014/10/1- 2014/12/31 | Agent2 |
| StorageB | - | - | Volume 1-3000 | 2014/10/1- Current | Agent1 |
| StorageB | Y | - | Volume 3001-6000 | 2014/10/1- Current | Agent2 |
| StorageA | Y | Port 1-50 | Volume 1-5000 | 2015/1/1- Current | Agent1 |
| StorageA | - | Port 51-100 | Volume 5001-10000 | 2015/1/1- Current | Agent2 |
| StorageA | - | - | Volume 10001-15000 | 2015/1/1- Current | Agent3 |
| StorageA | - | - | Volume 15001-20000 | 2015/1/1- Current | Agent4 |

FIG. 10

| ~150 | ~151 | ~152 | ~153 | ~154 | ~155 | ~156 |
|---|---|---|---|---|---|---|
| TIME OF RECORDING | STORAGE ID | VOLUME ID | TOTAL RESPONSE TIME | READ I/O RATIO | WRITE I/O RATIO | BUSY RATIO |
| 2015/4/1 00:00:00 | StorageA | Volume1 | 0.11 | 0.5 | 0.7 | 1.3 |
| 2015/4/1 00:00:05 | StorageA | Volume1 | 2.53 | 3.2 | 2.5 | 5.4 |
| ⋮ | ⋮ | ⋮ | ⋮ | ⋮ | ⋮ | ⋮ |
| 2015/4/1 00:00:00 | StorageA | Volume2 | 5.33 | 2.4 | 3.5 | 20.7 |
| 2015/4/1 00:00:05 | StorageA | Volume2 | 1.68 | 1.2 | 3.7 | 10.2 |
| ⋮ | ⋮ | ⋮ | ⋮ | ⋮ | ⋮ | ⋮ |
| 2015/4/1 00:00:00 | StorageA | Volume 10000 | 10.55 | 3.2 | 7.8 | 50.8 |
| 2015/4/1 00:00:05 | StorageA | Volume 10000 | 8.78 | 4.2 | 3.8 | 20.9 |
| ⋮ | ⋮ | ⋮ | ⋮ | ⋮ | ⋮ | ⋮ |

FIG. 11

| STORAGE ID ~160 | VOLUME ID ~161 |
|---|---|
| StorageA | Volume1-5000 |
| StorageB | Volume1-3000 |

FIG. 12

| 250 | 251 | 252 | 253 | 254 | ... | 255 |
|---|---|---|---|---|---|---|
| STORAGE ID | VOLUME ID | PERIOD | METRIC 1 | METRIC 2 | ... | METRIC 32 |
| StorageA | Volume 5001 | 2014/10/1- Current | TOTAL RESPONSE TIME | READ I/O RATIO | ... | BUSY RATIO |

FIG. 13

| 350 | 351 | 352 | 353 | 354 | 355 | ... | 356 |
|---|---|---|---|---|---|---|---|
| AGENT ID | STORAGE ID | VOLUME ID | PERIOD | METRIC 1 | METRIC 2 | ... | METRIC 32 |
| Agent1 | StorageA | Volume 5001 | 2014/10/1- 2014/12/31 | TOTAL RESPONSE TIME | READ I/O RATIO | ... | BUSY RATIO |

FIG. 14

| 450 | 451 |
|---|---|
| AGENT ID | ASSIGNMENT ALLOWED |
| Agent1 | Y |
| Agent2 | Y |
| Agent3 | Y |
| Agent4 | Y |
| Agent5 | N |

FIG. 15

| All Storage Systems |
|---|
| > Storage A |
| > Storage B |
| > Storage C |
| > Storage D |
| > Storage E |

Storage A

| Serial No. | Model | Volumes | Update |
|---|---|---|---|
| 000001 | R800 | 20000 | 2015/1/26 10:13:34 |

Volume | Port | CPU | ...

[Create Report] [Show Agent Monitor Range]

Start Time 2014/10/1 00:00:00    End Time 2015/4/1 00:00:00

| | Volume ID | Capacity | In Use | Update |
|---|---|---|---|---|
| ☑ | Volume1 | 500GB | 20GB | 2015/1/26 10:13:34 |
| ⋮ | ⋮ | ⋮ | ⋮ | ⋮ |
| ☐ | Volume 10000 | 4TB | 2.2TB | 2015/1/16 15:56:24 |

F I G. 2 7
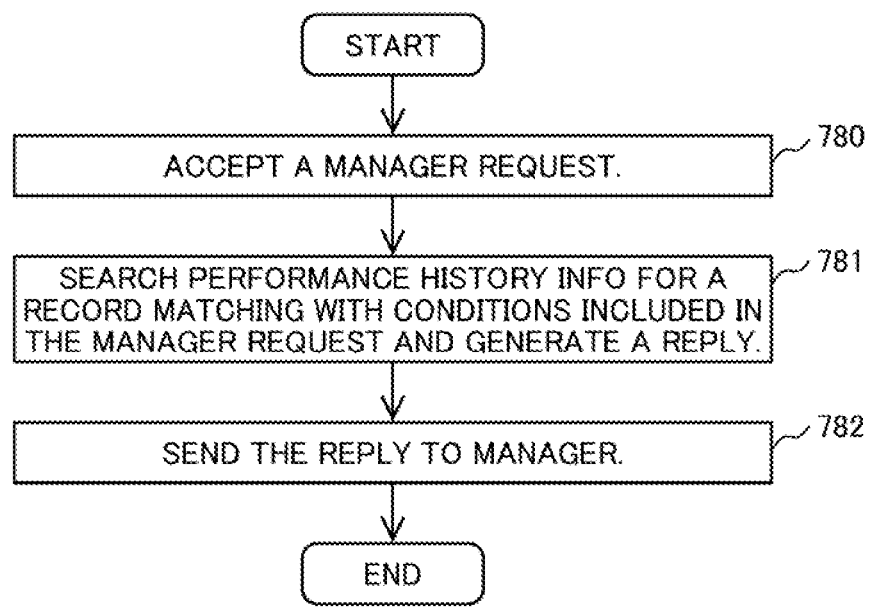

STORAGE MONITORING SYSTEM FOR MONITORING COMPONENTS IN A STORAGE SYSTEM IN A DISTRIBUTED MANNER

CROSS-REFERENCE TO RELATED APPLICATIONS

This application is a U.S. National Stage entry of PCT Application No. PCT/JP2015/071298, filed on Jul. 28, 2015, the contents of which are incorporated herein by reference.

TECHNICAL FIELD

The present invention relates to a storage monitoring system and a monitoring method therefor.

BACKGROUND ART

As storage systems have lately become massive in scale, there is a significant increase in the number of storage devices and the number of components including volumes or the like in a storage device. Because of an increasing load of monitoring such a storage system, monitoring it with a plurality of monitoring devices in a distributed manner is known.

Patent Literature (PTL) 1 discloses a technology of a storage area network provided with a plurality of agents (monitoring devices) for monitoring a plurality of devices of different types in a distributed manner.

CITATION LIST

Patent Literature

PTL 1: U.S. Pat. No. 7,469,284

SUMMARY OF INVENTION

Technical Problem

Use of the technology disclosed in PTL 1 enables it to monitor a great number of devices of different types in a distributed manner. However, this technology can not necessarily cope with a significant increase in the number of components in a device and it is becoming difficult to set a large quantity of components as objects to be monitored.

Thus, an object of the present invention is to enable it to monitor a plurality of components contained in a storage device in a storage system in a distributed manner.

Solution to Problem

A monitoring method for a storage monitoring system, which is representative, pertaining to the present invention is a monitoring method for a storage monitoring system including a storage device, a manager (device that manages agents), and a plurality of agents. It is featured that the manager stores information representing a first monitoring range of a plurality of components of a first type, out of a plurality of types of components contained in the storage device, to be monitored by a first agent out of the plurality of agents in association with information representing the first agent and notifies the first agent of the information representing the first monitoring range; and stores information representing a second monitoring range of the plurality of components of the first type to be monitored by a second agent out of the plurality of agents in association with information representing the second agent and notifies the second agent of the information representing the second monitoring range.

Advantageous Effects of Invention

According to the present invention, it is enabled to monitor a plurality of components contained in a storage device in a storage system in a distributed manner.

BRIEF DESCRIPTION OF DRAWINGS

FIG. 8A is a diagram representing an example of component information relevant to volumes.

FIG. 8B is a diagram representing an example of component information relevant to CPUs.

FIG. 8C is a diagram representing an example of component information relevant to communication IFs.

FIG. 9 is a diagram representing an example of monitoring range history information.

FIG. 10 is a diagram representing an example of performance history information.

FIG. 11 is a diagram representing an example of monitoring range information.

FIG. 12 is a diagram representing an example of information contained in a request which is sent from the client computer to the manager.

FIG. 13 is a diagram representing an example of information contained in a request which is sent from the manager to an agent.

FIG. 14 is a diagram representing an example of agent list information.

FIG. 15 is a diagram representing an example of display of a report request on the client computer.

FIG. 27 is a diagram illustrating an example of a flow of a process for a request to acquire performance.

DESCRIPTION OF EMBODIMENTS

Figure 1:
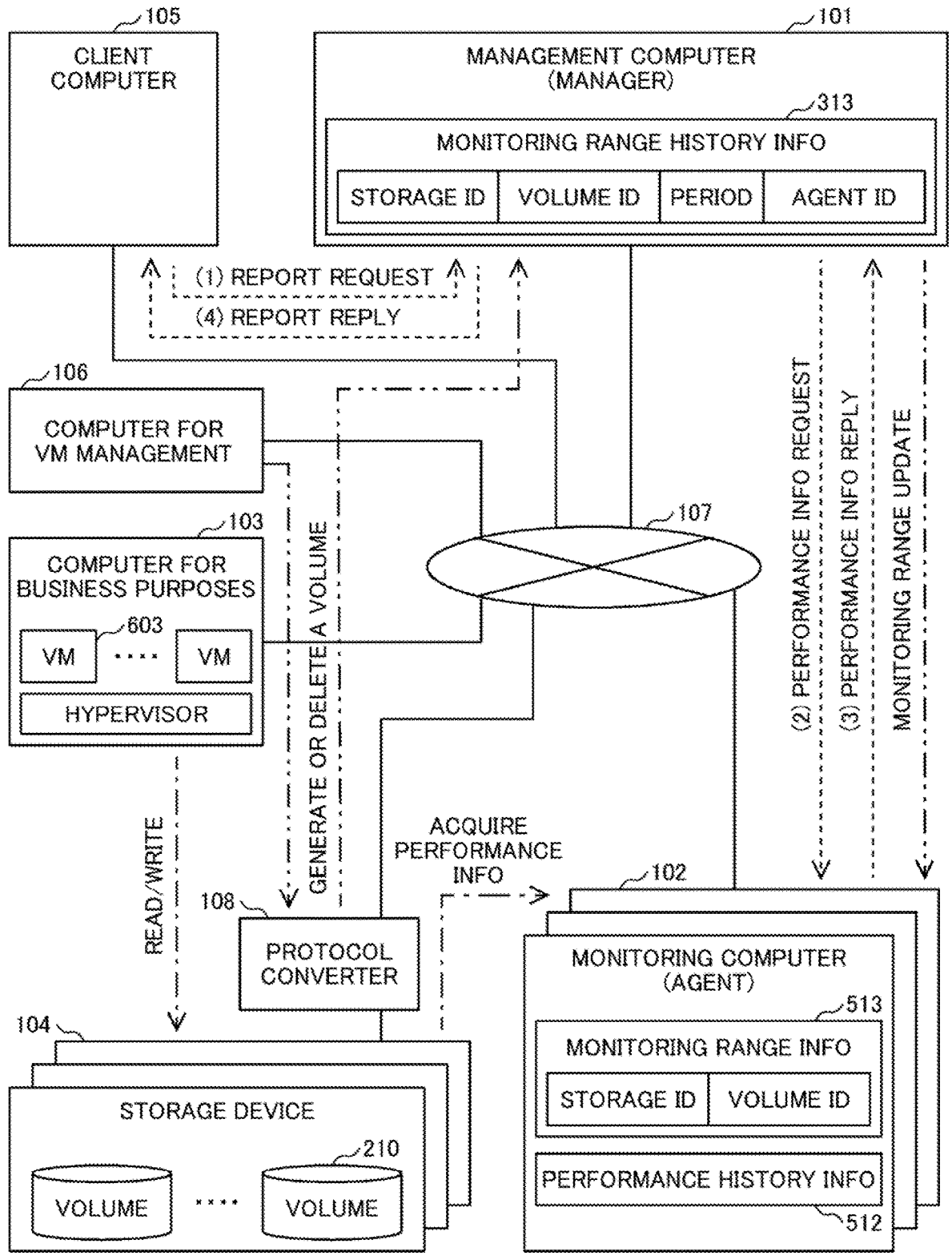
FIG. 1 is a diagram depicting an example of a configuration of a system.

In the following description, information that is handled in a system of the present invention is explained by representations such as an "aaa table", "aaa list", "aaa DB", and "aaa queue"; however, such information is not necessarily limited to data structures such as a table, list, DB (database), and queue and may be represented by a data structure other than mentioned above. Hence, an "aaa table", "aaa list", "aaa DB", and "aaa queue", among others, may sometimes be referred to as "aaa information" for the purpose of denoting independence of data structure. Additionally, in explaining contents of each information, representations such as "identification information", "identifier", "name", "designation", and "ID" are used, but these are replaceable with one another.

In the following description, sentences in which the subject is a "program" are sometimes written for explanation; the subject may be a processor instead of a program, since a program is executed by a processor to perform predefined processing tasks, using a memory and a communication port (communication control device). Processing steps disclosed by writing sentences in which the subject is a program may construed as processing steps that are executed by a computer such as a management server or an information processing device. A part or all of a program may also be implemented by dedicated hardware.

Moreover, various programs may be installed in each computer via a program distribution server or a computer-readable storage media. In this case, the program distribution server includes a CPU (Central Processing Unit) and storage resources and the storage resources further stores programs to be distributed. Then, the CPU executes a distribution program, so that the CPU of the program distribution server will distribute programs to be distributed to other computers.

A computer includes input/output devices. As examples of the input/output devices, a display, a keyboard, and a pointer device are conceivable; however, a computer may include other devices. As an alternative to the input/output devices, a serial interface or an Ethernet interface (Ethernet is a registered trademark) may also serve as an input/output device. By connecting a computer for display which includes a display, a keyboard, or a pointer device to such interface and, then, by transmitting information for display to the computer for display and receiving information for input from the computer for display, the computer for display which carries out display and input may substitute for display and input with the input/output devices.

In the following description, a set of one or more computers which manage an information processing system and display information for display, which is handled in the present invention, is sometimes referred to as a management system. When a management computer displays information for display, the management computer is a management system. Additionally, a combination of a management computer and a computer for display is also a management system. Moreover, a plurality of computers may implement processing tasks equivalent to those performed by a management computer to speed up management processing and enhance reliability. In this case, the plurality of computers (including a computer for display, if it carries out display) is a management system.

FIG. 1 is a diagram depicting an example of a configuration of a system. In this system, a management computer (hereinafter also referred to as a manager) 101 and a monitoring computer (hereinafter also referred to as an agent) 102 are to acquire performance information of a storage device 104 and provide it to a client computer 105. A computer for business purposes 103 executes a business application program and reads/writes data from/to a storage device 104. Performance information of a storage device 104 is performance information relevant to results of such read/write operations.

In the computer for business purposes 103, a plurality of VMs (virtual machines) 603 runs to execute a business application program. For example, by running VMWare ESX (a registered trademark) as a hypervisor, it is possible to assign a VVOL (virtual volume) to each VM 603; and by using a function which is provided by management software vSphere (a registered trademark), it is possible to generate or delete a VVOL. Then, by a request from the computer for business purposes 103 or a computer for VM management 106, a volume 210 is generated or deleted in a storage device 104 as a VVOL.

Since one VM 603 can read/write data in one volume 210, performance information has a unit that is a combination of a storage device 104 and a volume 210. In order to reflect an increase or decrease in the number of volumes 210 into management of objects for which performance information should be acquired, a protocol converter 108 which converts a protocol for a network 107 (or the computer for business purposes 103) to a protocol for storage devices 104 and vice versa may transfer a request to generate or delete a volume to the manager 101. In a system in which the protocol converter is unnecessary or a system in which the protocol converter 108 is incorporated in each storage device 104, each storage device 104 may transfer a request to generate or delete a volume to the manager 101.

An agent 102 acquires read/write performance information about a volume 210, as mentioned above, according to monitoring range information 513 and stores such information in performance history information 512. Here, the system includes a plurality of agents 102, a plurality of volumes 212 is divided into a plurality of monitoring ranges, and each agent 102 acquires performance information for each monitoring range. As the number of volumes 210 increases or decreases by a request to generate or delete a volume, monitoring range information 513 becomes inconsistent with an organization of volumes 210. Hence, the manager 101 determines a new monitoring range consistent with the organization of volumes 210 and notifies the agents 102 of the updated monitoring range.

The client computer 105 requests the manager 101 to provide a report on performance information by user operation. The manager 101 does not store performance information itself, but manages agents 102 which store performance according to monitoring range history information 313 and requests an agent 102 which stores required performance information to provide performance information. The requested agent 102 sends, as a reply, performance information stored in the performance history information 512 to the manager 101. The manager 101 sends, as a reply, a report based on the received performance information to the client computer 105.

If a report requested by the client computer 105 is across pieces of performance information respectively stored in a plurality of agents, the manager 101 acquires what piece of performance information is stored in what agent 102 from the monitoring range history information 313, requests the agents 102 to provide the pieces of performance information, and sends, as a reply, a report assembled from a plurality of replies from the agents 102 to the client computer 105.

In addition, respective devices in the system are interconnected via the network 107 and can communicate with one another. The network 107 may be, for example, Ethernet, the network 107 may include a plurality of networks, and a part of the network 107 may be a fiber channel network.

This system enables it to distribute a load of managing performance across a plurality of agents 102 for each monitoring range and to make a monitoring range update in response to a change in the organization of objects for which performance information should be acquired. Additionally, since the manager 101 manages the monitoring ranges of the agents 102 and the history thereof, even when the monitoring ranges are updated due to an increase or decrease in the number of volumes 210, it is not needed to relocate performance information stored on the agents 102.

Figure 2:
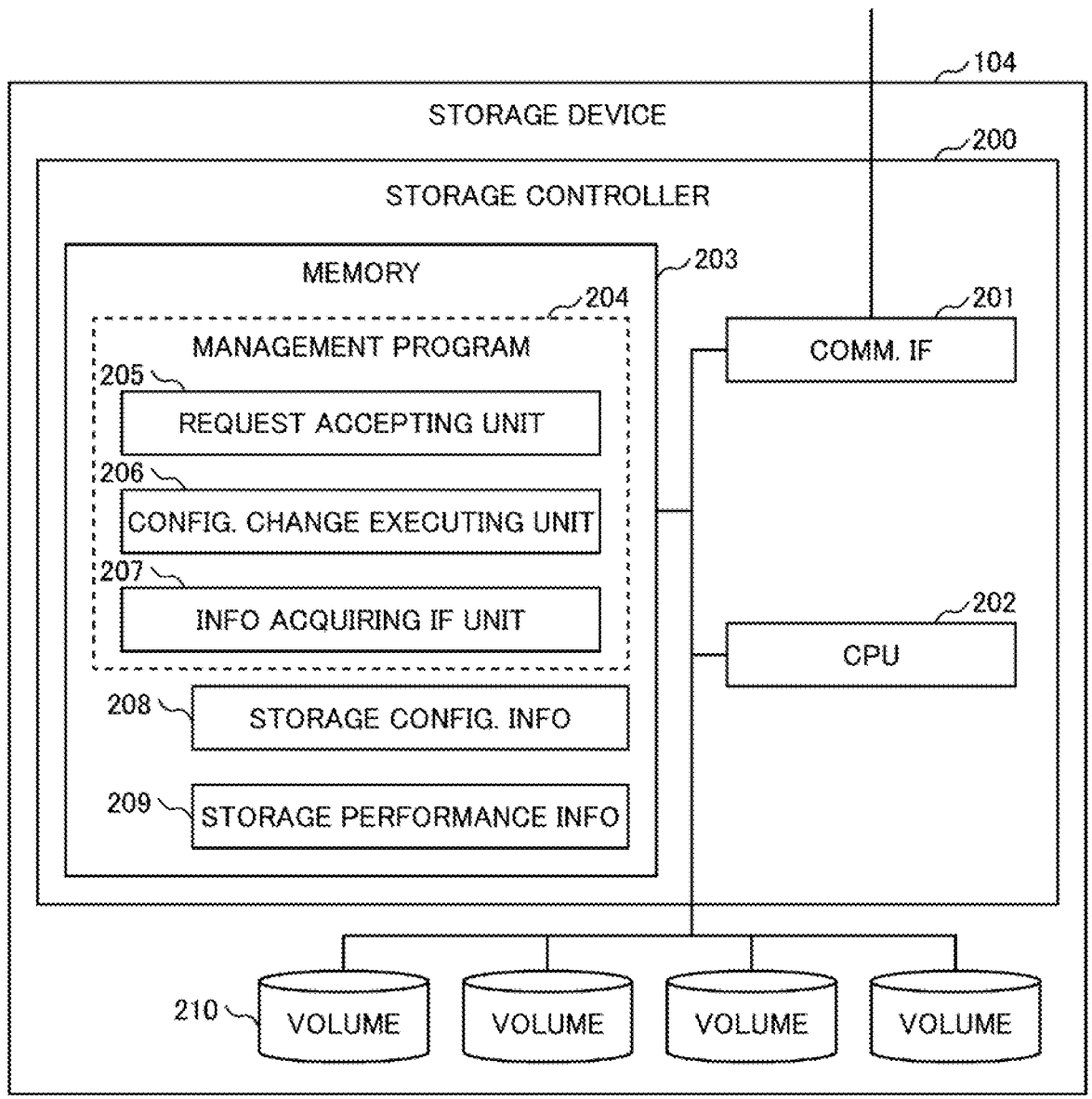
FIG. 2 is a diagram depicting an example of a configuration of a storage device.

FIG. 2 is a diagram depicting an example of a configuration of a storage device 104. A storage controller 200 performs control to read data from a volume 210 in response to a read request from a computer for business purposes 103 and send the read data to the computer for business purposes 103 and write data to a volume 210 in response to a write request from a computer for business purposes 103. Operation as above is a common technical knowledge in a field of storage technology and, therefore, description about structure therefor is omitted.

Volumes 210 are those storing data in a readable/writable manner and may be storage devices such as, e.g., HDDs (hard disk drives), SSDs (solid state drives), or other flash memories. A part of these storage devices may be available as one volume 210 or a plurality of these storage devices may be available as one volume 210.

A communication IF (interface) 201 is, for example, an Ethernet interface for communication with a computer for business purposes 103 and an agent 102. The storage controller 200 may have a plurality of communication IFs 201 or may include a fiber channel interface for communication with a computer for business purposes 103.

By executing a program stored in a memory 203, a CPU (processor) 202 transfers information between two of the communication IF 201, the memory 203, and the volumes 210 or makes a decision based on information acquired from any of the communication IF 201 the memory 203, and the volumes 210. The storage controller 200 may have a plurality of CPUs 202.

In the memory 203, a management program 204, storage configuration information 208, and storage performance information 209 may be stored and a program and information other than mentioned above may be stored. A request accepting unit 205 of the management program 204 is a module which accepts a request to generate or delete a volume 210 from a computer for business purposes 103 or a computer for VM management 106.

A configuration change executing unit 206 is a module which generates or deletes a volume 210 in response to a request accepted by the request accepting unit 205; it registers information representing a volume that is generated into the storage configuration information 208 or deletes information representing a volume that is deleted from the storage configuration information 208. In response to a request from an agent 102, an information acquiring IF unit 207 sends information registered in the storage configuration information 208 or information recorded in the storage performance information 209 to the agent 102.

The storage configuration information 208 includes information relevant to the volumes 210 and may include, for example, information relevant to a physical storage device of a volume 210. The storage performance information 209 includes information relevant to read/write performance from/to the volumes 210 and may include, for example, information representing a response time from acceptance of Read I/O until data has been read, amount of Read I/O, and amount of Write I/O. Information relevant to performance such as amount of Read I/O and amount of Write I/O may be an accumulated value from a particular time instant, e.g., a boot-up time of the storage device 104. Recording such information as an accumulated value makes it possible to reduce the amount of data to be recorded as compared with values recorded at time intervals as a history.

Figure 3:
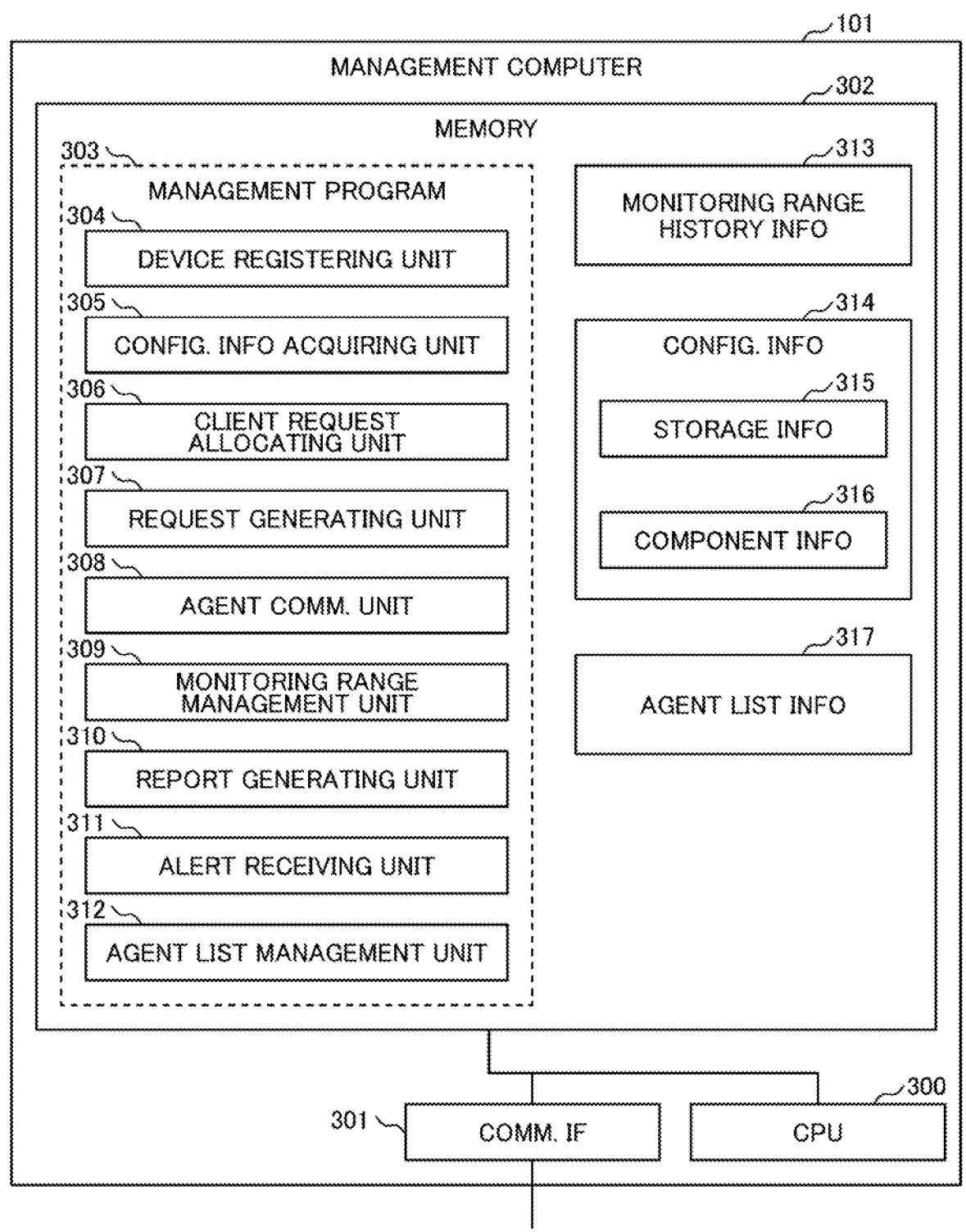
FIG. 3 is a diagram depicting an example of a configuration of a manager.

FIG. 3 is a diagram depicting an example of a configuration of the management computer (manager) 101. Hardware of the manager 101 may be a commonly used computer. A CPU 300 manages a storage device 104 via an agent 102 by executing a program stored in a memory 302. A communication IF 301 is, for example, an Ethernet interface for communication with an agent 102, the client computer 105, and a storage device 104. The communication IF 301 may also receive a request to generate or delete a volume, transferred from the protocol converter 108 and a storage device 104. Moreover, the manager 101 may have a plurality of communication IFs 301.

In the memory 302, a management program 303, monitoring range history information 313, configuration information 314, agent list information 317 may be stored and a program and information other than mentioned above may be stored. A device registering unit 304 of the management program 303 is a module which registers information as a device of a storage device 104 into storage information 315 within the configuration information 314. A configuration information acquiring unit 305 is a module which acquires information relevant to the volumes 210, information relevant to the communication IF 201, and information relevant to the CPU 202 of a storage device 104 registered by the device registering unit 304.

A client request allocating unit 306 is a module which determines what is requested by a request accepted from the client computer 105 and allocates the request to another module of the management program 303, which will be further described later with FIG. 17. A request generating unit 307 is a module which specifies an agent 102 of a request destination and a requested period and generates a request for performance information to an agent 102, which will be further described later with FIG. 20. An agent communication unit 308 is a module which sends a request generated by the request generating unit 307 to an agent 102 and receives a reply from the agent 102 and transfers it to a report generating unit 310, which will be further described later with FIG. 21.

A monitoring range management unit 309 is a module which determines monitoring ranges of each of a plurality of agents 102 and registers it into the monitoring range history information 313 and, besides, directs the monitoring ranges to each agent 102 and provides information for displaying the monitoring ranges to the client computer 105, which will be further described later with FIGS. 18 and 22 to 24. A report generating unit 310 is a module which generates a report of performance information by using the request generating unit 307 and the agent communication unit 308 and provides the report to the client computer 105, which will be further described later with FIG. 19.

An alert receiving unit 311 is a module which receives an alert of an overload in writing performance information, among others, from an agent 102, which will be further described later with FIG. 26. An agent list management unit 312 is a module which manages agents 102 allowed to be assigned to monitoring through the use of the agent list information 317, which will be further described later with FIGS. 22 and 23.

The monitoring range history information 313 is information recorded, as time passes, representing a relation between an agent 102 and a volume 210 in monitoring, which will be further described later with FIG. 9. Storage information 315 within the configuration information 314 is information for managing storage devices 104, which will be further described later with FIG. 7. Component information 316 is information for managing components such as the volumes 210 within a storage device 104, which will be further described later with FIGS. 8A to 8C. The agent list information 317 is information for managing agents 102 allowed to be assigned to monitoring, which will be further described later with FIG. 14.

Figure 4:
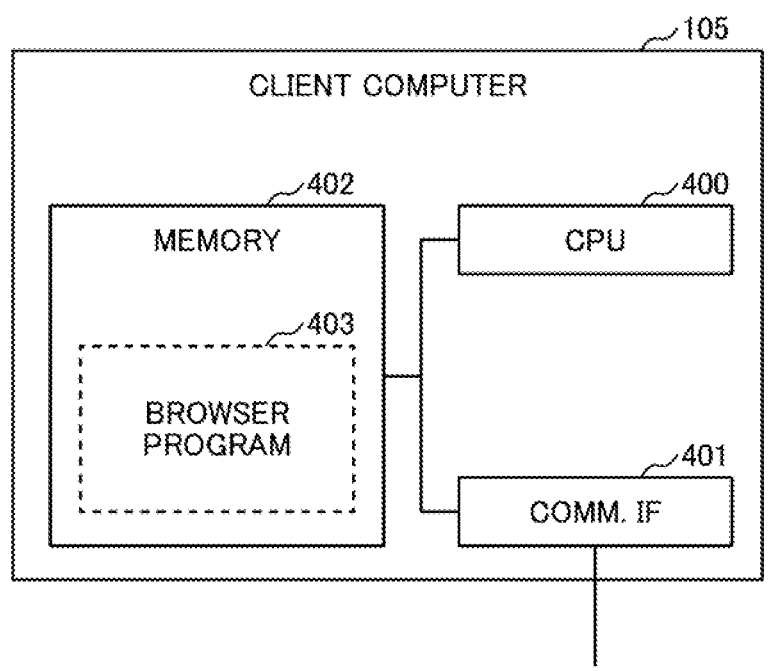
FIG. 4 is a diagram depicting an example of a configuration of a client computer.

FIG. 4 is a diagram depicting an example of a configuration of the client computer 105. Hardware of the client computer 105 may be a commonly used computer. A CPU 400 communicates with the manager 101 through a communication IF 401 by executing a program stored in a memory 402. In this example, a browser program 403 is stored in the memory 402, a value entered from an input device, omitted from depiction, to a browser display window of a display device, omitted from depiction, is sent to the manager 101 and information for display received from the manager 101 is displayed on the browser display window.

Figure 5:
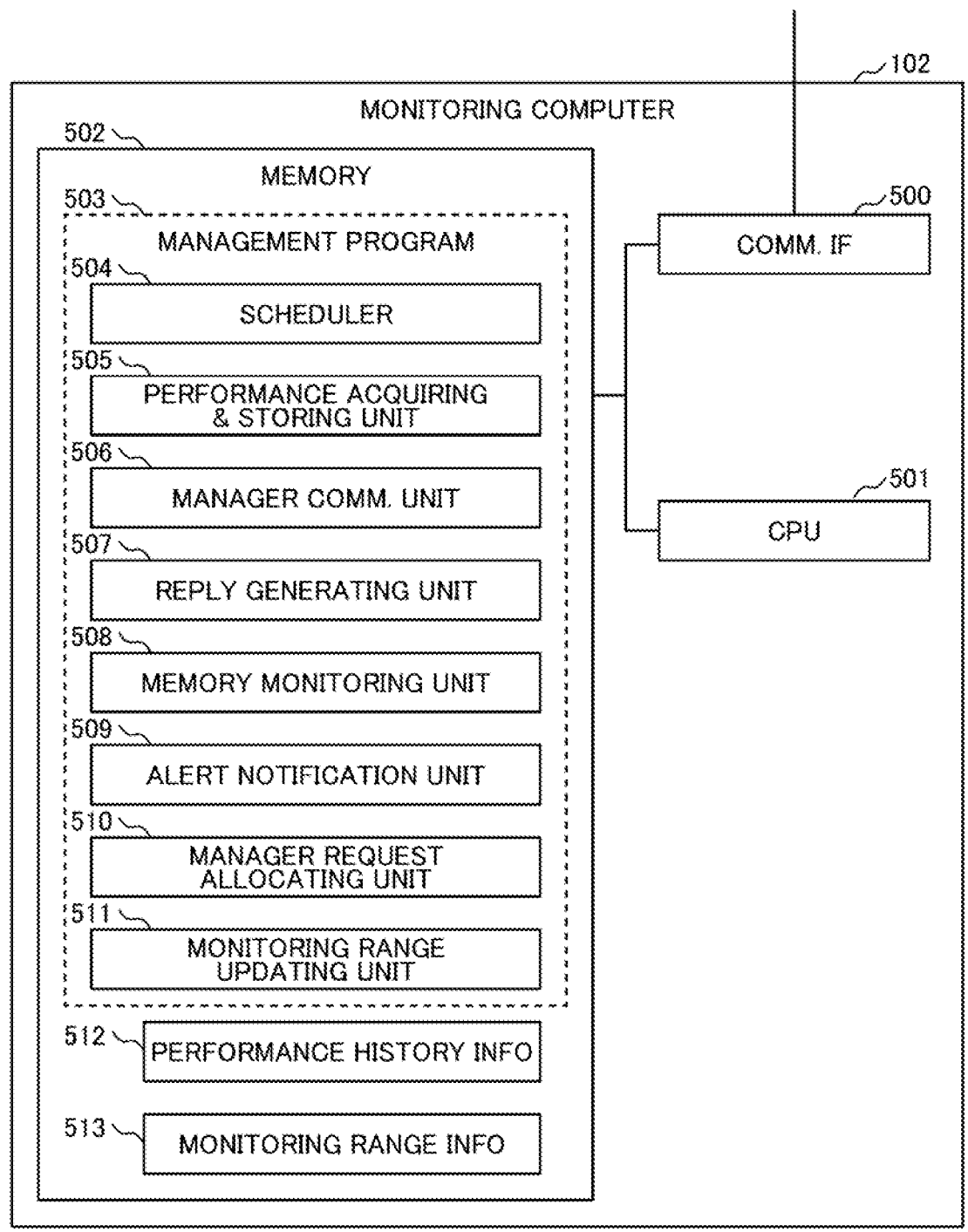
FIG. 5 is a diagram depicting an example of a configuration of an agent.

FIG. 5 is a diagram depicting an example of a configuration of a monitoring computer (agent) 102. Hardware of the agent 102 may be a commonly used computer. A CPU 501 communicates with and monitors a storage device 104 by executing a program stored in a memory 502. A communication IF 500 is, for example, an Ethernet interface for communication with the manager 101 and a storage device 104. The agent 102 may have a plurality of communication IFs 500.

In the memory 502, a management program 503, performance history information 512, and monitoring range information 513 may be stored and a program and information other than mentioned above may be stored. The performance history information 512 may also be stored in a dedicated memory different from the memory 502. A scheduler 504 of the management program 503 is a module which starts up a module which has been set at set time intervals; for example, it starts up a performance acquiring and storing unit 505 periodically.

The performance acquiring and storing unit 505 is a module which specifies a storage device 104 and a range of components (e.g., volumes) therein which are to be monitored, referring to monitoring range information 513, acquires performance information relevant to the components within the range in the specified storage device 104, and records the acquired performance information into performance history information 512, which will be further described later with FIG. 26. A manager communication unit 506 is a module which accepts a request to acquire performance information from the manager 101 and sends a reply to the manager 101 in response to the request, which will be further described later with FIG. 27.

A reply generating unit 507 is a module which generates a reply, referring to the performance history information 512, in response to a request accepted by the manger communication unit 506, which will be further described later with FIG. 27. A memory monitoring unit 508 is a module which calculates a time for writing when recording data into the performance history information 512 in the memory 502 and determines whether a write delay occurs according to the time for writing, which will be further described later with FIG. 26. An alert notification unit 509 is a module which sends an alert notification to the manager 101, based on a judgment as to whether a write delay occurs by the memory monitoring unit 508.

A manager request allocating unit 510 is a module which determines what is requested by a request accepted from the manager 101 and allocates the request to another module of the management program 503, which will be further described later with FIG. 25. A monitoring range updating unit 511 is a module which records information representing a monitoring range notified from the manager 101 into the monitoring range information 513.

Performance history information 512 is a history of performance information acquired from a storage device 104 and information in which a storage device 104 to be monitored and its performance information are recorded at time intervals, which will be further described later with FIG. 10. Monitoring range information 513 is information which specifies a range of objects to be monitored by the agent 102, which will be further described later with FIG. 11. Based on this monitoring range information 513, the agent 102 monitors a storage device 104 and components therein. In addition, although past performance information in the performance history information 512 may be inconsistent with the monitoring range information 513, such past information is recorded in the monitoring range history information 313 on the manager 101.

Figures 6, 7:
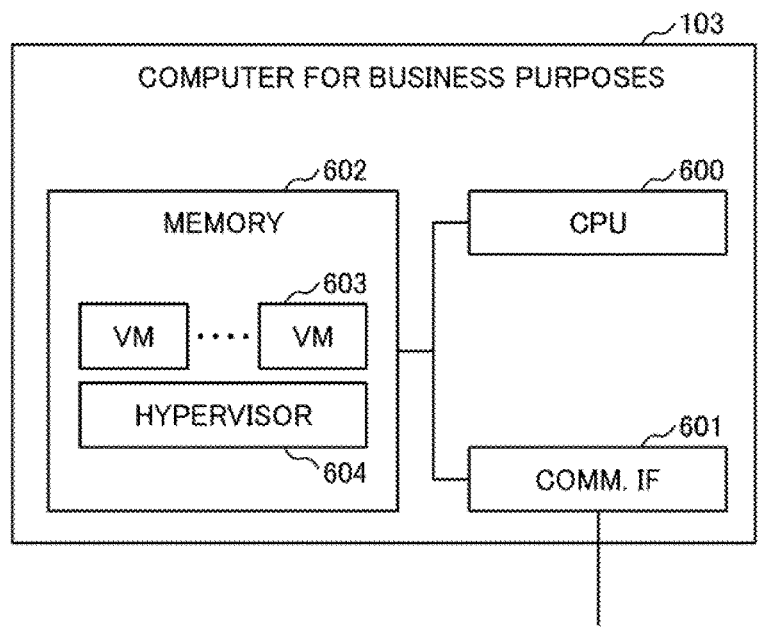
FIG. 6 is a diagram depicting an example of a configuration of a computer for business purposes.
FIG. 7 is a diagram representing an example of storage information.

FIG. 6 is a diagram depicting an example of a configuration of a computer for business purposes 103. Hardware of the computer for business purposes 103 may be a commonly used computer. In a memory 602, a plurality of system images of VMs 603 is stored and a hypervisor 604 program for managing the VMs 603 is stored. A business application program is executed by the CPU 600 using the environment of the VMs 603 and reads/writes data from/to a storage device 104 through the communication IF 601.

VVOLs may be assigned to the respective VMs 603 and each VVOL may correspond to a volume 210. Hence, a volume 210 may be generated when a VM 603 is generated and a volume 210 may be deleted when a VM 603 is deleted. The respective VMs 603 are managed by the computer for VM management 106. Hence, a request to generate or delete a volume 210 may be sent from the computer for business purposes 103 to a storage device 104 or from the computer for VM management 106 to a storage device 104.

FIG. 7 is a diagram representing an example of storage information 315. The storage information 315 is stored as configuration information 314 in the memory 302 of the manager 101, as described with FIG. 3. Storage ID 700 is information identifying each storage device 104 throughout the system. Serial number 701 is a serial number assigned to each storage device 104, e.g., when manufactured. Model 702 is a product designation of each storage device 104. The number of volumes 703 is the number of volumes 210 in each storage device 104. Time of update 704 is a time instant when information on each storage device 104 was updated.

In addition, in an example of FIG. 7, when the storage information 315 is regarded as a table, a row like the one containing, associated with "StorageA" as the storage ID 700, "00001" as the serial number 701, "R800" as the model 702, "2000" as the number of volumes, and "2015/1/26 10:13:34" as the time of update 704 is referred to as a record. Hereinafter, a row will be referred to as a record in each information that is regarded as a table.

FIG. 8A is a diagram representing an example of component information 316 relevant to volumes 210. The component information 316 is stored as configuration information 314 in the memory 302 of the manager 101, as described with FIG. 3. Volume ID 800 is information identifying a volume 210. Storage ID 801 is information identifying a storage device 104 including the volume 210, the information corresponding to storage ID 700. Capacity 802 is a storage capacity of the volume 210. Assigned capacity 803 is a capacity being assigned to a computer for business purposes 103 in the storage capacity of the volume 210. Time of update 804 is a time instant when information on each volume 210 was updated.

FIG. 8B is a diagram representing an example of component information 316 relevant to CPUs 202. CPU ID 805 is information identifying a CPU 202. Storage ID 806 is information identifying a storage device 104 including the CPU 202, the information corresponding to storage ID 700. Time of update 807 is a time instant when information on each CPU 202 was updated.

FIG. 8C is a diagram representing an example of component information 316 relevant to communication IFs 201. Port ID 808 is information identifying a port of communication IF 201. Storage ID 809 is information identifying a storage device 104 including the communication IF 201, the information corresponding to storage ID 700. Time of update 810 is a time instant when information on each port was updated.

In addition, volumes 210, CPUs 202, and communication IFs 201 are different types of components and information on another type of component may be managed as component information 316.

FIG. 9 is a diagram representing an example of monitoring range history information 313. The monitoring range history information 313 is stored in the memory 302 of the manager 101, as described with FIG. 3. Storage ID 900 is information identifying a storage device 104, the information corresponding to storage ID 700. Primary 901 is information denoting one agent 102 selected out of one or a plurality of agents 102 which monitor one storage device 104 and information indicating that it is an agent 102 which monitored a monitoring range not recorded in the monitoring range history information 313.

Port ID 902 is information identifying a port of communication IF 201 of the storage device 104. Volume ID 903 is information identifying volumes 210 in a range. Period 904 is information denoting a period which is represented by monitoring start and end dates. Agent ID 905 is information identifying an agent 102.

In the monitoring range history information 313, information that what storage device 104, what port, and what volume 210 were monitored by what agent 102 is accumulated as a history in order of periods denoted in the period 904 field. An example of FIG. 9 expresses that, for a period of "2014/10/1-2014/12/31" in the period 904 field, volumes 210 in a range, which are identified by "Volume1" to "Volume10000" in the volume ID 903 field, of a storage device 104, which is identified by "StorageA" in the storage ID 900 field, were monitored by an agent 102, which is identified by "Agent1" in the agent ID 905 field, and thus monitored information was recorded on the agent 102 identified by "Agent1".

In the period 904 field, when monitoring is started, a monitoring start date and "Current" are recorded; when the monitoring terminates, a monitoring end date is recorded instead of "Current". In addition, in the period 904 field, a time instant may be recorded in addition to a date.

In the example of FIG. 9, information relevant to CPUs 202 does not exist in the monitoring range history information 313. This example implies that an agent 102 which is identified in the agent ID 905 field for a record with "Y" in the primary 901 field monitored such information not recorded in the monitoring range history information 313. Hence, this example implies that, for a period of "2014/10/1-2014/12/31" in the period 904 field, the CPU 202 of the storage device 104, which is identified by "StorageA" in the storage ID 900 field, was monitored by the agent 102 which is identified by "Agent1" in the agent ID field.

Additionally, if a volume 210 which is identified by "volume30000" as volume ID exists in the storage device 104 identified by "StorageA" in the storage ID field, that volume 210 is not recorded in the monitoring range history information 313. Therefore, this example implies that the volume 210 was also monitored by the agent 102 which is identified by "Agent1" in the agent ID field.

FIG. 10 is a diagram representing an example of performance history information 512. The performance history information 512 is stored in the memory 502 of an agent 102, as described with FIG. 5. Time of recording 150 is a time instant when performance information as a record was recorded. Storage ID 151 is information identifying a storage device 104, the information corresponding to storage ID 700. Volume ID 152 is information identifying a volume 210. Performance information relevant to an object specified by information in the storage ID 151 and volume ID 152 fields is accumulated according to time of recording 150.

Fields from total response time 153 to busy ratio 156 contain performance information and total response time 153 is a time it takes from acceptance of a read request until sending back read data. Read I/O ratio 154 and write I/O ratio 155 are read I/O and write I/O percentages per unit time. Busy ratio 156 is a percentage of time that is used for read or write during a given period of time. These pieces of performance information are relevant to volumes 210, but no limitation to them is intended, and other metrics relevant to volumes 210 may be included. Performance information on components other than volumes 210 may also be included.

A retention period of the performance history information 512 may be set beforehand and records for which a value in the time of recording 150 field has exceeded the retention period may be deleted. The same retention period may be set for the monitoring range history information 313 as well and records for which a value in the period 904 field has exceeded the retention period may also be deleted. If a volume 210 is deleted, performance information relevant to the deleted volume 210 may be retained until the retention period expires, without deleting any record in the performance history information 512.

FIG. 11 is a diagram representing an example of monitoring range information 513. The monitoring range information 513 is stored in the memory 502 of an agent 102, as described with FIG. 5. Storage ID 160 is information identifying a storage device 104, the information corresponding to storage ID 700. Volume ID 161 is information identifying volumes 210 in a range. Objects specified by information in the storage ID 160 and volume ID 161 fields are monitored and their performance information is acquired and recorded into the performance history information 512.

When objects to be monitored by an agent 102 are changed, the monitoring range information 513 of the agent 102 is changed and the history of the objects to be monitored in the past is managed through the use of the monitoring range history information 313. An example of FIG. 11 concerns monitoring of volumes 210; however, this example may include information identifying components other than volumes 210.

FIG. 12 is a diagram representing an example of information contained in a request which is sent from the client computer 105 to the manager 101. An example of FIG. 12 is information which is sent when the client computer 105 requests the manager 101 to provide performance information and information entered via the browser program 403 in the client computer 105. Information to identify a storage device 104 as a storage ID 250 and information to identify a volume 210 as a volume ID 251 specify a component whose performance information is to be acquired. Other information may be possible that can identify a component. If performance information of a component other than a volume 210 is to be acquired, information to identify a component other than a volume 210 may be entered instead of the volume ID 251.

Period 252 indicates a period for which performance information is to be acquired. "Total response time" as Metric 1 253, "Read I/O ratio" as Metric 2 254, and "busy ratio" as Metric 32 255 correspond to the total response time 153, read I/O ratio 154, and busy ratio 156 in the performance history information 512 described with FIG. 10. These pieces of information are metrics for a component which is identified by the storage ID 250 and the volume ID 251; however, other metrics may be possible that correspond to metrics recorded in the performance history information 512.

In an example presented in FIG. 12, for example, a value such as "StorageA" which is the same as in FIG. 10 is used for representation to make description easy to understand; another value to identify the same one may be used. For this purpose, information that a user can identify as "StorageA" on the browser may be converted to information that can be identified as "StorageA" actually recorded in the performance history information 512.

Moreover, since the total response time and others are information of one metric for a component which is named a volume 210, such information may be referred to as component metrics information.

FIG. 13 is a diagram representing an example of information contained in a request which is sent from the manager 101 to an agent 102. An example of FIG. 13 is information which is sent when the manger 101 requests an agent 102 to provide performance information. Since this information is based on the information contained in the request described with FIG. 12, storage ID 351, volume ID 352, Metric 1 354, Metric 2 355, and Metric 3 356 each correspond to the storage ID 250, volume ID 251, Metric 1 253, Metric 2 254, and Metric 3 255.

Agent ID 350 is information identifying an agent 102 of a request destination. Period 353 indicates a period for which the agent 102 identified by the agent ID 350 monitored the object during the period indicated by the period 252. FIGS. 12 and 13 are an example in which "Agent1" monitored the object for a period of "2014/10/1-2014/12/31" and another agent 102 monitored the object for a subsequent period.

FIG. 14 is a diagram representing an example of agent list information 317. The agent list information 317 is information which is stored in the memory 302 of the manager 101. Agent ID 450 is information identifying an agent 102. Assignment allowed 451 is information indicating whether or not assignment of a monitoring range is allowed; this field contains "Y" if the assignment is allowed and contains "N" if the assignment is not allowed.

An agent 102 which is newly added is added to the agent list information 317 and "Y" is set in the assignment allowed 451 field. An agent 102 which is deleted is deleted from the agent list information 317 after "N" is set in the assignment allowed 451 field. These steps of processing will be further described later with FIGS. 22 and 23.

FIG. 15 is a diagram representing an example of display of a report request on the client computer 105. When a storage device 104 is selected in a storage device selection 550 area, information on the selected storage device 104 is displayed in a storage device information 551 area and components that can be selected are displayed in a component selection 552 area. When a component is selected using a tab and checkbox among others in the component selection 552 area and a button 553 is pressed, information contained in the request described with FIG. 12 is sent to the manager 101.

Figure 16:
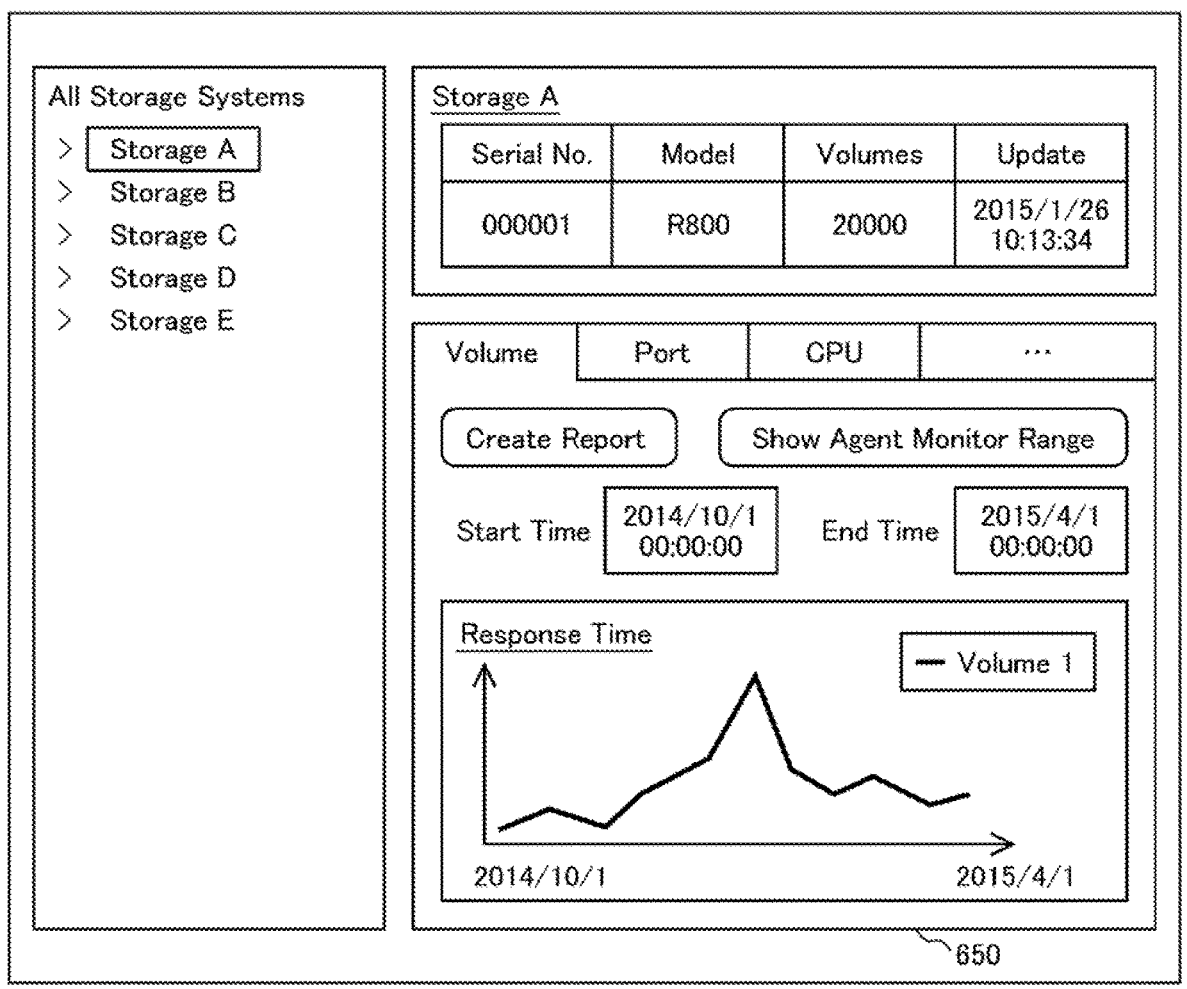
FIG. 16 is a diagram representing an example of display of a report on the client computer.

In addition, it may be arranged that metrics for a component selected in the component selection 552 area can also be selected or that all metrics for a selected component are requested to the manager 101 and a selection out of the metrics can be made in a report display which is described with FIG. 16.

FIG. 16 is a diagram representing an example of display of a report on the client computer 105. In this example, there is a performance display 650 area instead of the component selection 552 area and a change in the total response time of a selected volume 210, as time passes, is displayed as a graph. In addition, performance information may be displayed in a table form other than a graph form or pieces of performance information in terms of a plurality of metrics may be displayed in array or in a superimposed manner.

Figure 17:
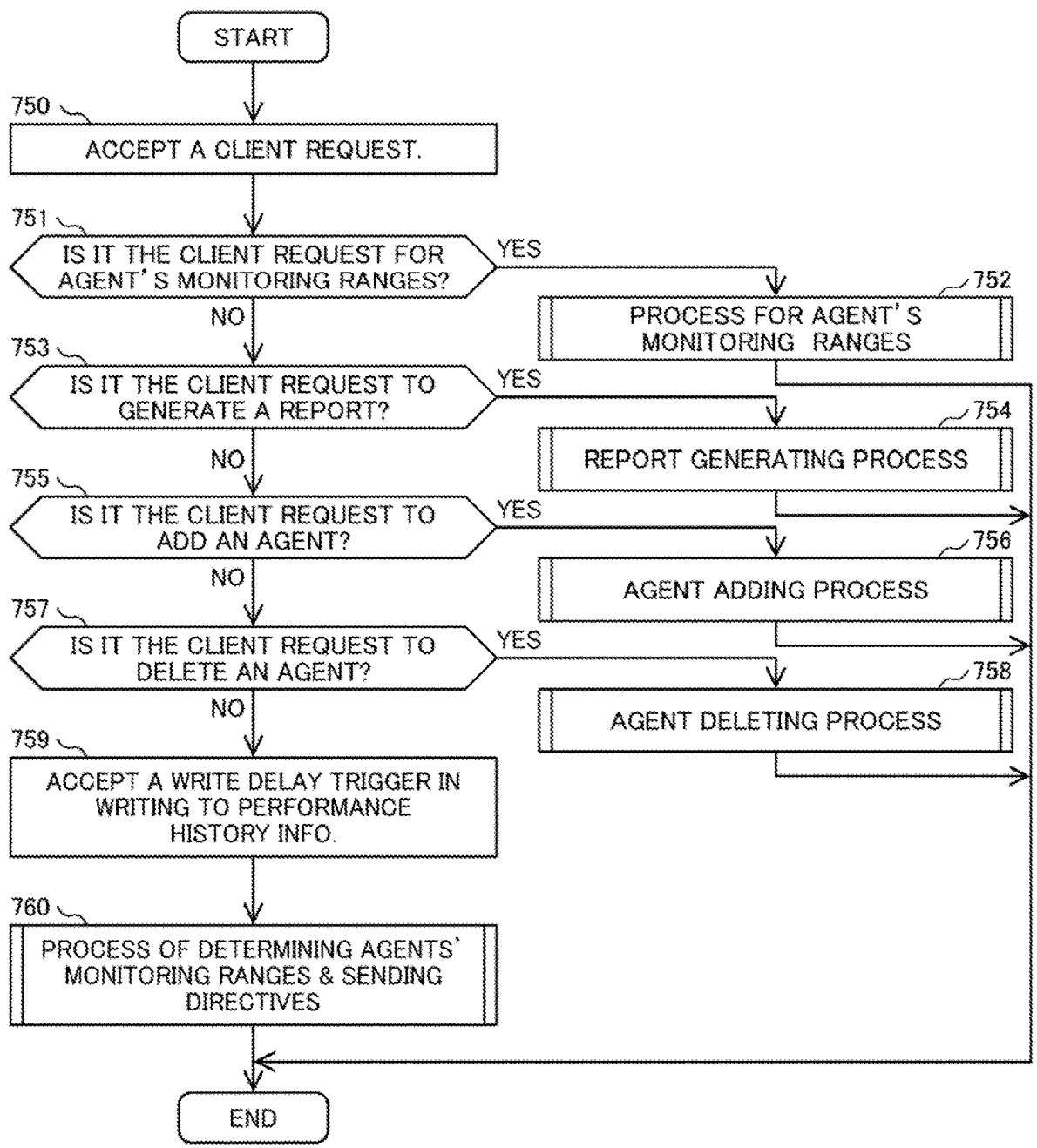
FIG. 17 is a diagram illustrating an example of a flow of a process of allocating the client request.

FIG. 17 is a diagram illustrating an example of a flow of a process of allocating the client request. When the client request allocating unit 306 accepts a request from the client computer 105 (step 750), it determines whether the client request is a request for agents' monitoring ranges (step 751). If it has determined that the client request is a request for agents' monitoring ranges, the process flow goes to a process for agents' monitoring ranges (step 752). The process for agents' monitoring ranges will be further described later with FIG. 18.

If the client request allocating unit 306 has determined that the client request is not a request for agents' monitoring ranges, it determines whether the client request is a request to generate a report (step 753). If it has determined that the client request is a request to generate a report, the process flow goes to a report generating process (step 754). The report generating process will be further described later with FIG. 19.

If the client request allocating unit 306 has determined that the client request is not a request to generate a report, it determines whether the client request is a request to add an agent (step 755). If it has determined that the client request is a request to add an agent, the process flow goes to an agent adding process (step 756). The agent adding process will be further described later with FIG. 22.

If the client request allocating unit 306 has determined that the client request is not a request to add an agent, it determines whether the client request is a request to delete an agent (step 757). If it has determined that the client request is a request to delete an agent, the process flow goes to an agent deleting process (step 758). The agent deleting process will be further described later with FIG. 23.

If the client request allocating unit 306 has determined that the client request is not a request to delete an agent, it passes control to the alert receiving unit 311. The alert receiving unit 311 accepts a write delay trigger in writing to the performance history information 512 from an agent 102 (step 759). Then, in order to eliminate a write delay, the process flow goes to a process of determining monitoring ranges of agents 102 and sending directives (step 760).

Figure 18:
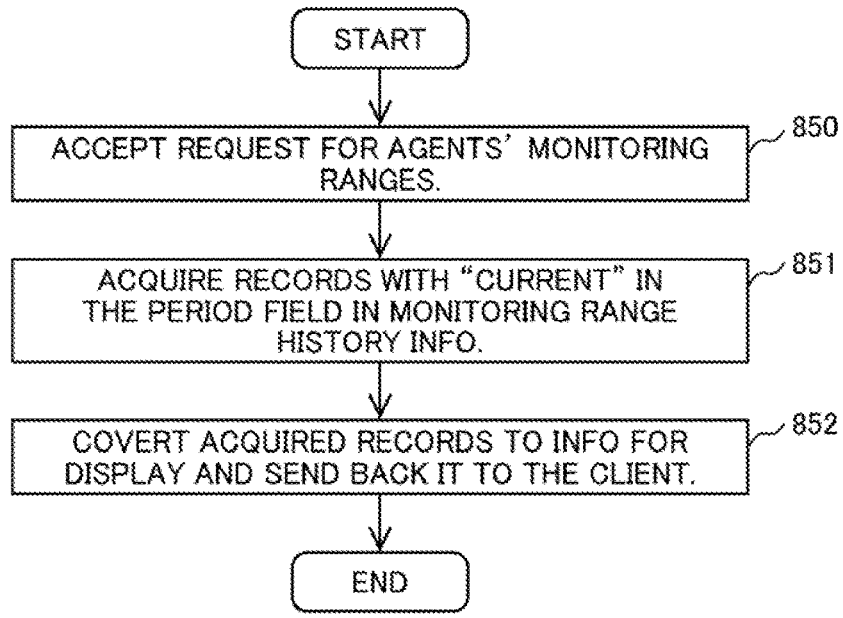
FIG. 18 is a diagram illustrating a flow of a process for agents' monitoring ranges.

FIG. 18 is a diagram illustrating a flow of the process for agents' monitoring ranges. This process allows the client computer 105 to display the monitoring ranges of agents 102. The monitoring range management unit 309 accepts a request for monitoring ranges from the client request allocating unit 306 (step 850) and acquires records including "Current" in the period 904 field in the monitoring range history information 313 (step 851). Then, it sends information contained in the acquired records to the client computer 105 (step 852). Here, the information contained in the acquired records may be processed appropriately for display on the client computer 105. Since the monitoring ranges of agents 102 are determined by the manager 101, a user can check status of the determined monitoring ranges.

Figure 19:
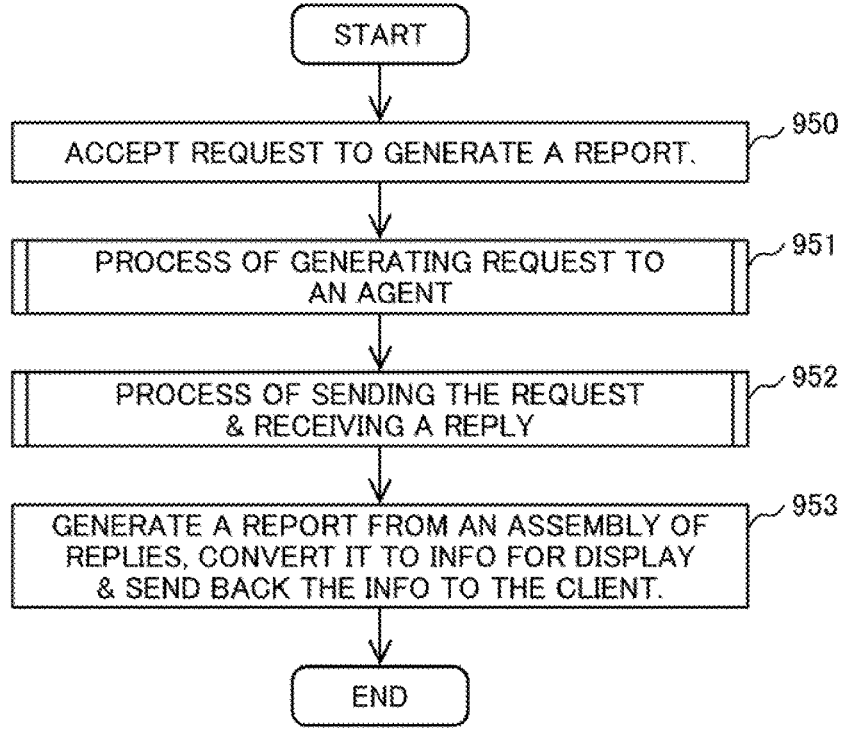
FIG. 19 is a diagram illustrating an example of a flow of a report generating process.

FIG. 19 is a diagram illustrating an example of a flow of the report generating process. The request generating unit 307 accepts a request to generate a report from the client request allocating unit 306 (step 950). The request to generate a report may contain the information contained in the request described with FIG. 12. Moreover, metrics information may be dispensed with, which indicates a request for performance information in terms of all metrics.

The request generating unit 307 specifies an agent 102 of a request destination and generates a request appropriate for the agent 102 of the request destination (step 951). This step of generating a request will be further described with FIG. 20. The request generating unit 307 passes the generated request to the agent communication unit 308 and the agent communication unit 308 sends the request and receives a reply to the request (step 952). The agent communication unit 308 assembles replies received and passes an assembly of them to the report generating unit 310 and the report generating unit 310 converts the assembly of replies to report information for display and sends it to the client computer 105.

Figure 20:
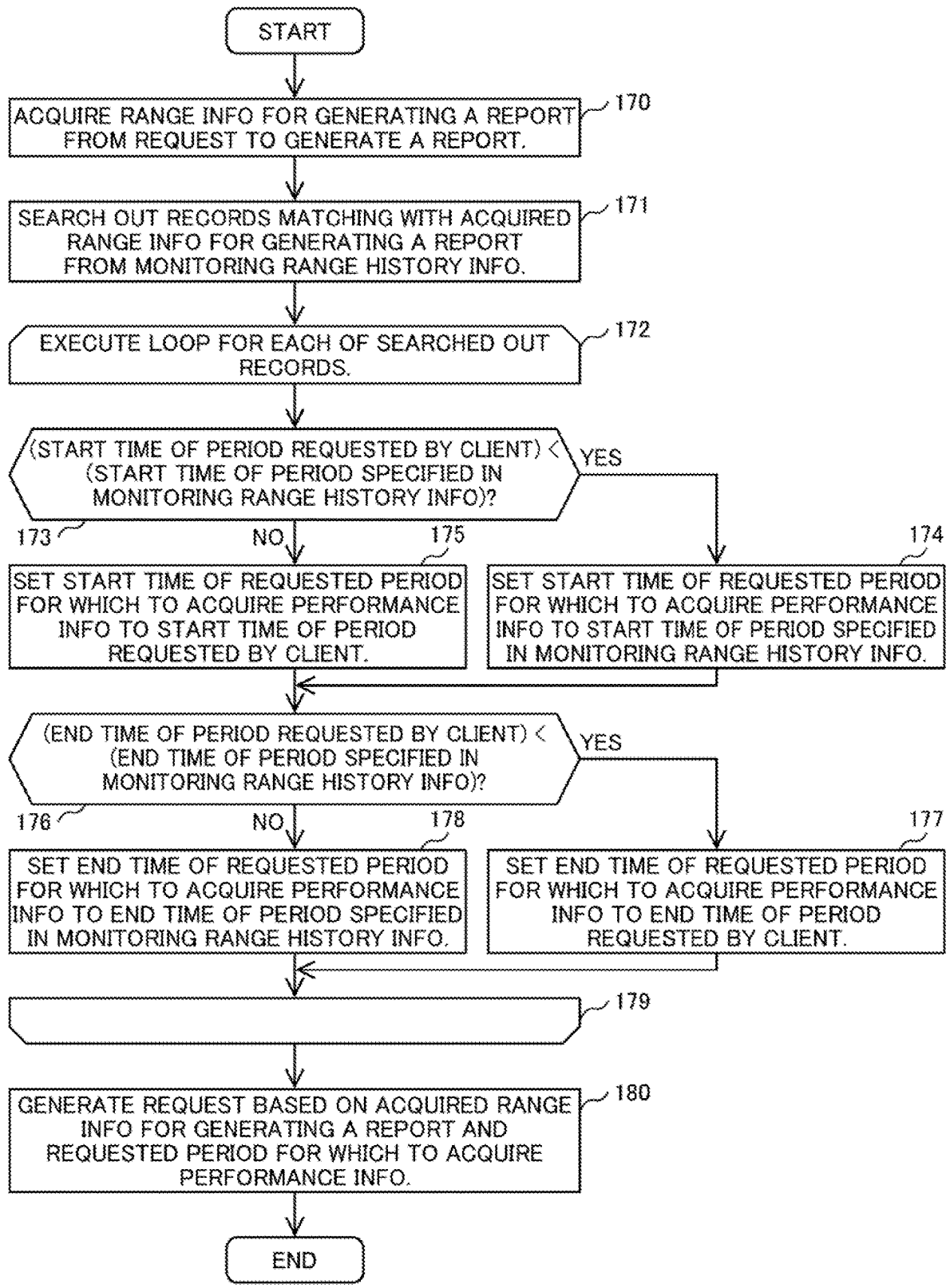
FIG. 20 is a diagram illustrating an example of a flow of a request generating process.

FIG. 20 is a diagram illustrating an example of a flow of a request generating process. This process is processing in the step 951 described with FIG. 19. Even for performance information on one component, its performance history information may be distributed across a plurality of agents 102 for different periods. Hence, in such a case, the request generating unit 307 determines each period and generates a plurality of requests. The request generating unit 307 acquires each piece of information representing storage ID 250, volume ID 251, and period 252 described with FIG. 12 as range information for generating a report.

The request generating unit 307 searches the monitoring range history information 313 to look out records for which the value of the storage ID 250 matches a value in the storage ID 900 field, for which the value of the volume ID 251 falls within a range of values in the volume ID 903 field, and for which the period given as the period 252 overlaps a period in the period 904 field (step 171). Here, there may be a plurality of periods in the period 904 filed, which overlaps the period given as the period 252. Thus, Steps 172 to 179 are repeated to determine a requested period for which to acquire performance information on a per-record basis, which will be sent to an agent 102.

For one of the records searched out, taken as an object, the request generating unit 307 is to execute a series of steps 173 to 178 (step 172) and determines whether the start time (requested) of the period 252 requested by the client computer 105 is earlier than the start time of the period specified in the period 904 field (step 173). If the start time (requested) of the period 252 is earlier, as determined at step 173, the request generating unit 307 sets the start time of the requested period for which to acquire performance information to the start time of the period specified in the period 904 field (step 174); if the start time (requested) of the period 252 is not earlier, as determined at step 173, it sets the start time of the requested period for which to acquire performance information to the start time (requested) of the period 252 (step 175).

The request generating unit 307 determines whether the end time (requested) of the period 252 requested by the client computer 105 is earlier than the end time of the period specified in the period 904 field (step 176). If the end time (requested) of the period 252 is earlier, as determined at step 176, the request generating unit 307 sets the end time of the requested period for which to acquire performance information to the end time (requested) of the period 252; if the end time (requested) of the period 252 is not earlier, as determined at step 176, it sets the end time of the requested period for which to acquire performance information to the end time of the period specified in the period 904 field. If the execution of steps 173 to 178 has not yet been completed for all the records searched out, the request generating unit 307 returns to step 172 and re-executes the steps 173 to 178 for another record; upon completing the execution for all the records, it goes to step 180.

The request generating unit 307 generates a request in which, for each of the records searched out at step 171, information specified in the agent ID 905 field is assigned to the agent ID 350 in FIG. 13, information specified in the storage ID 900 field (the same one in the storage ID 250 field) is assigned to the storage ID 351 (in FIG. 13), information specified in the volume ID 251 field is assigned to the volume ID 352 (in FIG. 13), and the requested period for which to acquire performance information determined in a series of steps 172 to 179 is assigned to the period 353 (in FIG. 13) (step 180). In addition, Metric 1 253 and other Metrics may be assigned to Metric 1 354 and other Metrics.

If a component for which acquiring performance information is requested is a port, information specified in the port ID 902 field may be used instead of the volume ID 903 in the foregoing description. If a component not recorded in the monitoring range history information 313 is the one for which acquiring performance information is requested, records with "Y" in the primary 901 field may be searched out instead of the volume ID 903 in the foregoing description.

Figure 21:
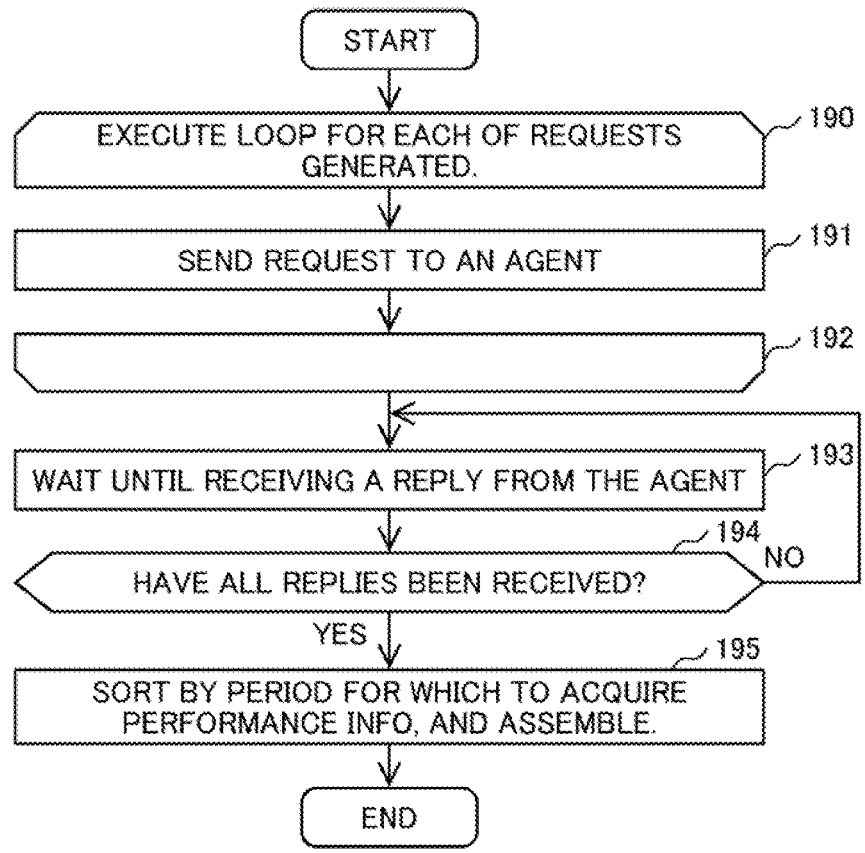
FIG. 21 is a diagram illustrating an example of a flow of a process of sending a request and receiving a reply.

FIG. 21 is a diagram illustrating an example of a flow of a process of sending the request and receiving a reply. This process is processing in the step 952 described with FIG. 19 and includes sending the request generated as described with FIG. 20 to an agent 102 and receiving a reply from the agent 102. As described previously, the request is divided into a plurality of requested periods for which to acquire performance information depending on the requested period as the period 252 and, therefore, received replies are assembled.

Since step 191 is repeated for each of requests generated at step 951, the agent communication unit 308 is to execute the process for one of the requests generated, taken as an object (step 190) and sends the request to an agent 102 identified by the agent ID 350 (step 191); it returns to step 190 until sending all the requests. Here, sending the request at step 191 is repeated without waiting for a reply from the agent 102.

The agent communication unit 308 waits until receiving a reply from the agent 102 (step 193) and, upon receiving a reply, determines whether it has received all replies (step 194); it returns to step 193 until determining that is has received all replies. Here, a reply may, for example, contain information described with FIG. 10. The reply may also include information identifying an agent 102 that sent the reply or may also include the requested period for which to acquire performance information or may also include only performance information corresponding to the metrics included in the request.

The agent communication unit 308 sorts and assembles every ones of a plurality of replies received in chronological order of the requested period for which to acquire performance information or time of recording and passes an assembly of replies to the report generating unit 310 (step 195).

Figure 22:
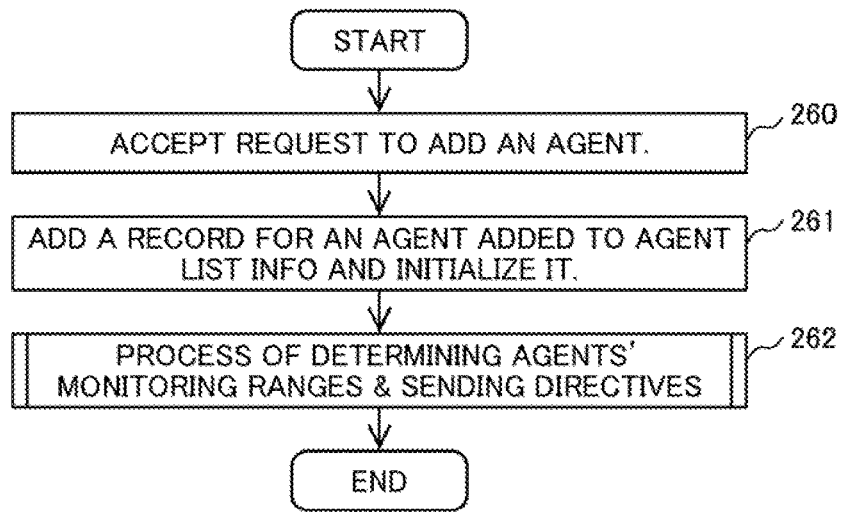
FIG. 22 is a diagram illustrating an example of a flow of a process of adding an agent.

FIG. 22 is a diagram illustrating an example of a flow of a process of adding an agent 102. This process is processing in the step 756 described with FIG. 17. The agent list management unit 312 accepts a request to add an agent from the client request allocating unit 306 (step 260), adds a record to the agent list information 317, sets information identifying an agent to be added 102 in the agent ID 450 field, and enters "Y" in the assignment allowed 451 field.

To assign a monitoring range to the added agent 102, the process of determining monitoring ranges of agents 102 including the added agent 102 and sending directives is executed (step 262). The process of determining monitoring ranges of agents 102 and sending directives will be further described with FIG. 24. In addition, step 262 only carries out reassignment of monitoring ranges, but does not perform relocating performance information accumulated in the past between agents 102.

Figure 23:
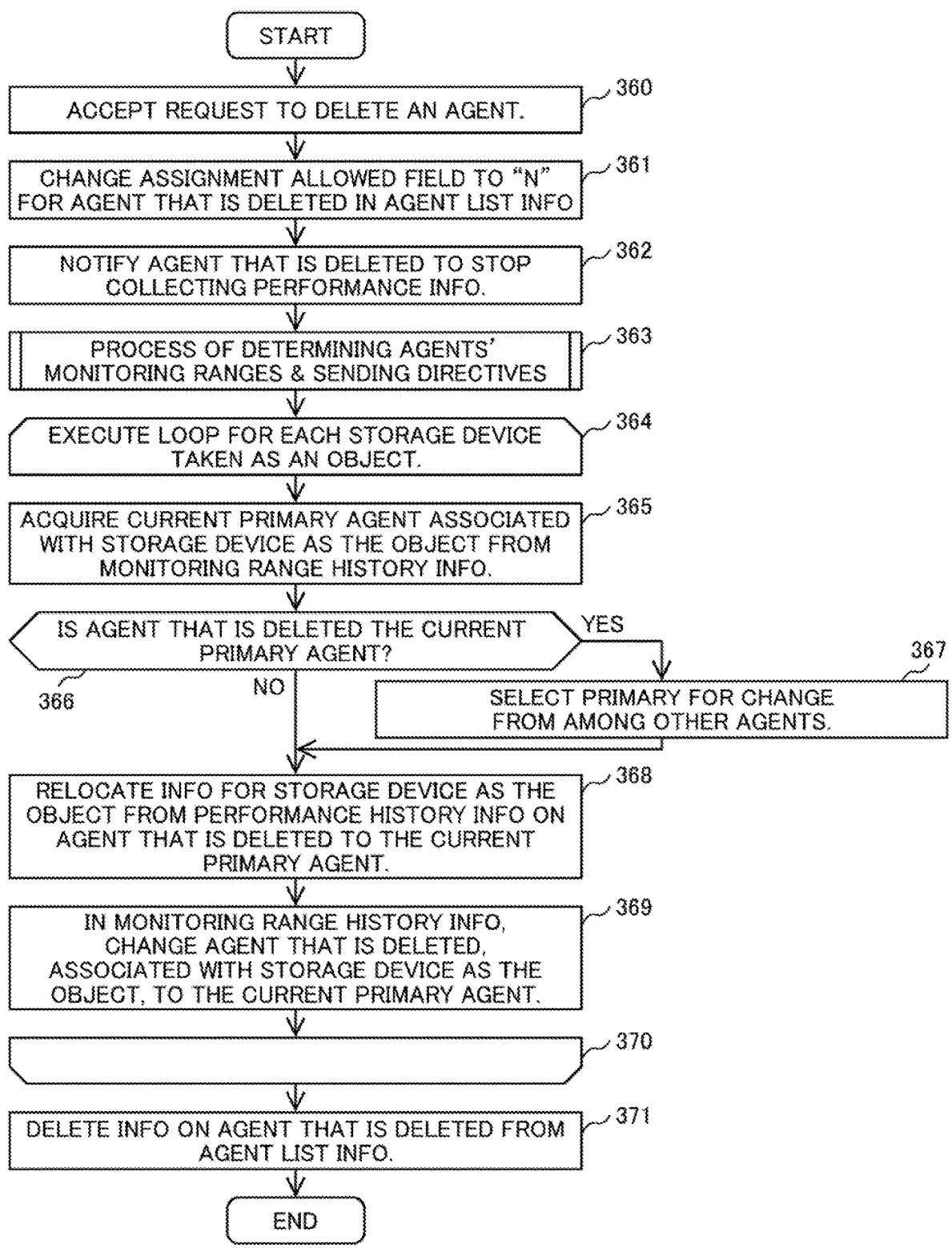
FIG. 23 is a diagram illustrating an example of a flow of a process of deleting an agent.

FIG. 23 is a diagram illustrating an example of a flow of a process of deleting an agent 102. This process is processing in the step 758 described with FIG. 17. When an agent 102 is deleted, performance history information 512 accumulated for the deleted agent 102 becomes unusable and, therefore, the performance history information 512 becoming unusable by the deletion is relocated to another agent 102. Monitoring ranges are also reassigned to agents 102 except the deleted agent 102.

The agent list management unit 312 accepts a request to delete an agent from the client request allocating unit 306 (step 360) and, in the agent list management information 317, changes the assignment allowed 451 field to "N" for a record in which the agent ID 450 matches information identifying the agent 102 that is deleted (step 361). Thereby, the agent 102 that is deleted is deleted from assignments of monitoring ranges at step 363.

The agent list management unit 312 notifies the agent 102 that is deleted to stop collecting performance information (step 362) and executes the process of determining monitoring ranges of agents 102 and sending directives (step 363). In consequence of step 363, collecting performance information based on new assignments is initiated on the respective agents 102. Although the process of determining monitoring ranges of agents 102 and sending directives will be further described with FIG. 24, monitoring ranges are reassigned to all agents other than the agent 102 that is deleted. Instead, only the monitoring range assigned to the agent 102 that is deleted may be reassigned to other agents 102.

The agent list management unit 312 acquires a list of storage devices 104 or its equivalent for which their performance information is recorded in the performance history information 512, associated with the agent 102 that is deleted and is to repeat the execution of steps 365 to 369 for each of the storage devices 104, taken as an object, in the acquired list (step 364). Thereby, the performance history information 512 for the agent 102 that is deleted is relocated to another agent 102.

The agent list management unit 312 searches records in the monitoring range history information 513 for which information in the storage ID 900 field matches information identifying the storage device 104 taken as the object at step 364 to search out records including "Current" in the period 904 field and with "Y" in the primary 901 field and acquires information identifying an agent 102 in the agent ID 905 field of the searched out records (step 365). It then determines whether there is a match between information identifying the agent 102 that is deleted and information identifying an agent 102 acquired at step 365 (step 366).

If there is a match, as determined at step 366, the agent list management unit 312 selects a primary from among agents 102 other than the agent 102 that is deleted and changes the primary to the selected agent 102 (step 367). Thereby, the changed primary also becomes "Current". If there is not a match, at step 366, and after the execution of step 367, performance information for the storage device 104 taken as the object at step 364 is relocated from the performance history information 512 on the agent 102 that is deleted to the agent 102 that is the "Current" primary (step 368).

For relocation at step 368, the agent list management unit 312 may issue a relocation directive to the agent 102 that is deleted or the "Current" primary agent 102 or may issue a relocation directive to both the agent 102 that is deleted and the "Current" primary agent 102. In the monitoring range history information 513, the agent list management unit 312 changes information in the agent ID field 905 of the record in which information in the storage ID field 900 matches information identifying the storage device 104 taken as the object at step 364 and information in the agent ID 905 field matches information identifying the agent 102 that is deleted to information identifying the agent 102 to which the performance information for the storage device is relocated.

Until determining that the execution of steps 365 to 369 is done for all the storage devices 104 in the list acquired at step 364, the agent list management unit 312 returns to step 364 and takes another storage device in the list as an object. Upon determining that the execution of steps 365 to 369 is done for all the storage devices 104 in the list, the agent list management unit 312 deletes information identifying the agent 102 that is deleted and "N" mapped to the agent from the agent list information 317.

Figure 24:
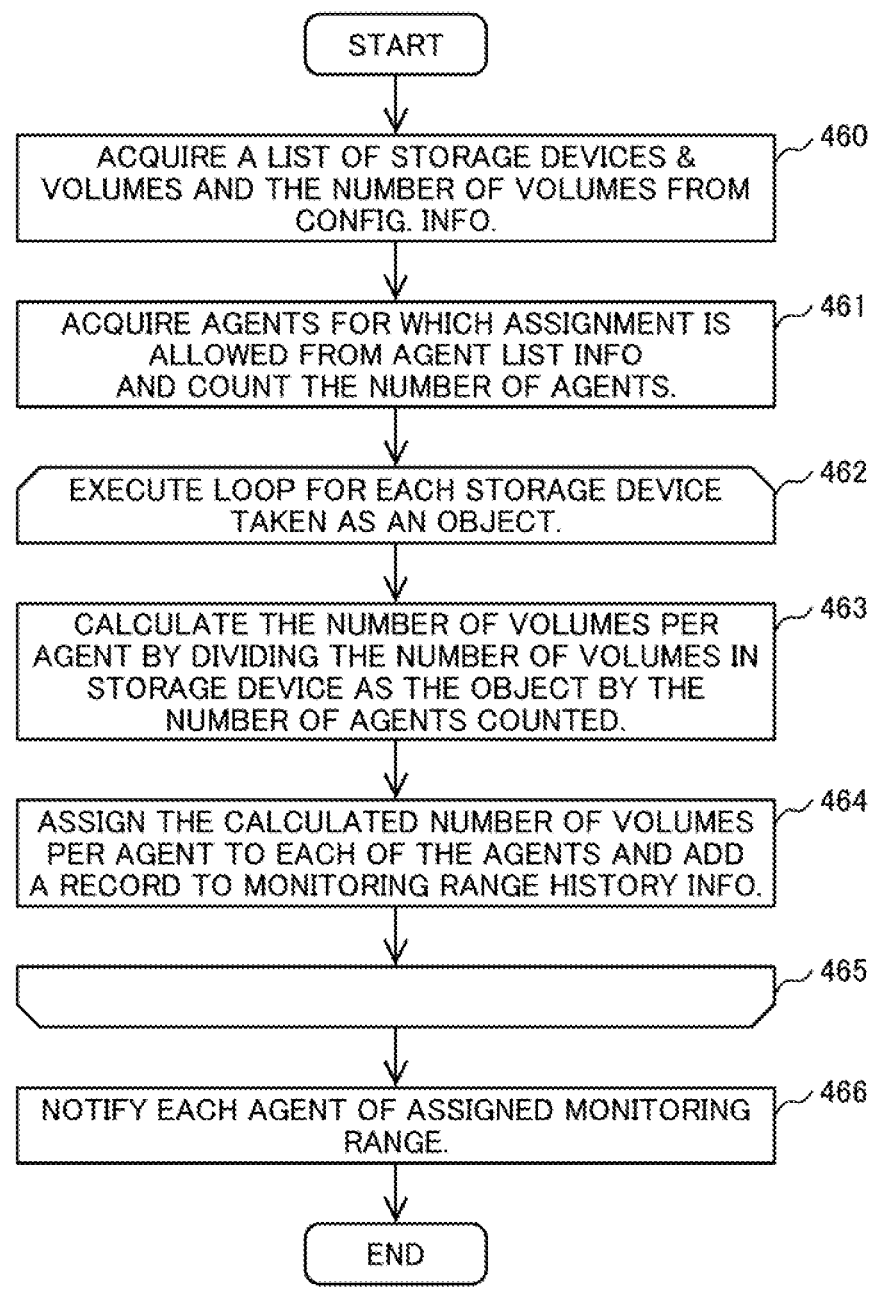
FIG. 24 is a diagram illustrating an example of a flow of a process of determining monitoring ranges of agents and sending directives.

FIG. 24 is a diagram illustrating an example of a flow of the process of determining monitoring ranges of agents 102 and sending directives. This process is processing in the step 760 described with FIG. 17, the step 262 described with FIG. 22, and the step 363 described with FIG. 23. The monitoring range management unit 309 acquires a list of storage device 104 and volumes 210 and the number of volumes from the configuration information 314 (step 460). The monitoring range management unit 309 also acquires a list of agents with "Y" in the assignment allowed 451 field from the agent list information 317 and counts the number of the agents 102 acquired (step 461).

For each of the storage devices 104 in the list acquired at step 460, taken as an object, the monitoring range management unit 309 is to repeat steps 463 to 464. The monitoring range management unit 309 calculates the number of volumes per agent 102 by dividing the number of volumes in the storage device 104 taken as the object at step 462 by the number of agents counted (step 463).

To assign volumes as many as the number of volumes calculated to each of the agents 102 acquired, the monitoring range management unit 309 adds a record to the monitoring range history information 313. For the added record, it sets information identifying the storage device 104 in the storage ID 900 field, sets information identifying the volumes as many as the number of volumes calculated in the volume ID 903 field, and sets information identifying the agents 102 acquired in the agent ID 905 field (step 464).

Here, some of records in which there is a match between information identifying the storage device 104 taken as the object and information specified in the storage ID 900 field includes "Current" in the period 904 field. "Current" in such records may be changed to a preceding day (or the current day) acquired from a clock omitted from depiction within the manger 101 and the end time of a period in the period 904 field for the added record may be set to "Current". A primary agent 102 may be selected and "Y" may also be set in the primary 901 field.

Until processing all the storage devices 104 in the list acquired at step 460, the monitoring range management unit 309 returns to step 462 (step 465); upon processing all the storage devices 104, it notifies the agents 102 acquired of the volumes assigned to each (step 466). Since the number of volumes in the storage device 104 taken as the object at step 462 is divided by the number of agents counted and assigned, a plurality of agents 102 counted monitors one storage device 104 as the object for monitoring.

Although an example in which equal divisions of the number of volumes are assigned as monitoring ranges of volumes is illustrated in the description with FIG. 24, no limitation to this is intended. Volumes may be assigned to the agents 102, based on another parameter of volumes, for example, such as information representing performance of volumes. Additionally, volumes may be assigned to the agents 102, based on loads of the agents, for example, the load of the CPU 501 and read/write time of the memory 502, instead of parameters relevant to volumes. Monitoring ranges may be determined so as to be even within a preset error range.

Moreover, when a volume 210 has been generated or deleted, the process described with FIG. 24 may be executed.

Figure 25:
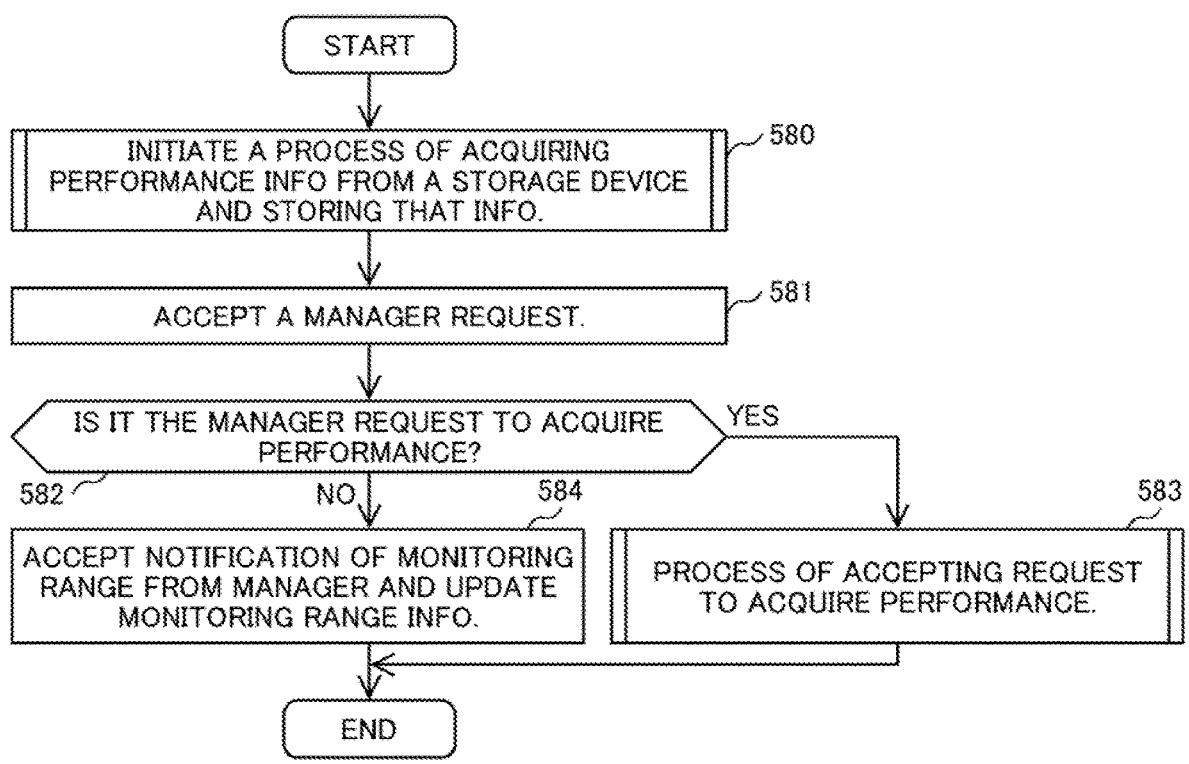
FIG. 25 is a diagram illustrating an example of a flow of a process on an agent.

FIG. 25 is a diagram illustrating an example of a flow of a process on an agent 102. The agent 102 acquires performance information from a storage device 104 and records that information and, moreover, executes a process in response to a request from the manager 101. When the agent 102 is started up, the scheduler 504 is activated and a process of acquiring performance information from a storage device 104 and storing that information is initiated based on a schedule of the scheduler 504. This process will be further described with FIG. 26.

The manager request allocating unit 510 on the agent 102 accepts a request from the manager 101 (step 581) and determines whether the manager request is to acquire performance (step 582). If it has determined that the manager request is to acquire performance, it executes a process of accepting the request to acquire performance (step 583). This process will be further described with FIG. 27. If having determined that the manager request is not to acquire performance, the manager request allocating unit 510 on the agent 102 accepts a notification of a monitoring range updated, described for step 466 in FIG. 24, from the manager 101 and the monitoring range updating unit 511 updates the monitoring range information 513 (step 584).

Figure 26:
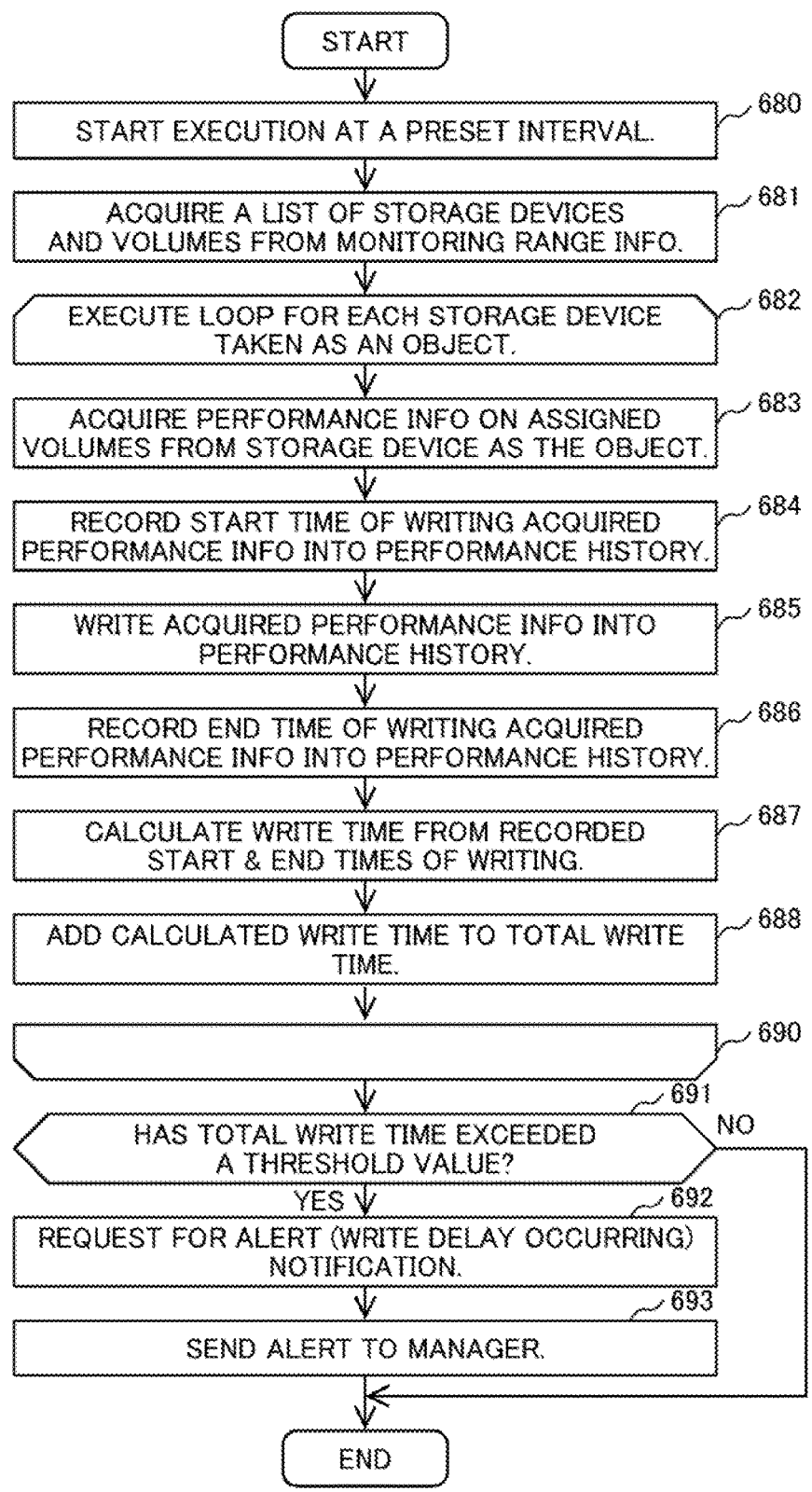
FIG. 26 is a diagram illustrating an example of a flow of a process of acquiring performance information and storing that information.

FIG. 26 is a diagram illustrating an example of a flow of the process of acquiring performance information and storing that information. The scheduler 504 starts execution by the performance acquiring and storing unit 505 based on a preset interval (step 680). The performance acquiring and storing unit 505 acquires respective pieces of information specified in the storage ID 160 and volume ID 161 fields in the monitoring range information 513 (step 681) and is to repeat the execution of steps 683 to 688 for each storage device 104, taken as an object, which is identified by identification information specified in the storage ID 160 field.

The performance acquiring and storing unit 505 acquires performance information on volumes 210 in a range which are identified by identification information specified in the volume ID 161 field from the storage device 104 taken as the object at step 682 (step 683). Here, a packet including, as a destination, a storage device 104 corresponding to information specified in the storage ID 160 field and, as a monitoring range, information specified in the volume ID 161 field may be sent from the agent 102 to the storage device 104. The destination may be just the information specified in the storage ID 160 field or information to which the information specified in the storage ID 160 field has been converted. For this conversion, the agent 102 may acquire in advance, from the manager 101, IP addresses or the like of respective storage devices 104 or their specific numbers or the like that can be used to generate an address from the manager or may acquire in advance, from the respective storage devices 104, information relevant to these addresses.

The memory monitoring unit 508 which monitors the memory 502 records the start time of writing the performance information acquired at step 683 into the performance history information 512 in the memory 502 (step 684). Then, the performance acquiring and storing unit 505 writes the acquired performance information into the performance history information 512 (step 685).

Upon termination of step 685, the memory monitoring unit 508 writes the end time of writing (step 686) and calculates a write time from a difference between the start time recorded at step 684 and the end time recorded at step 686 (step 687). Then, it adds the write time calculated at step 687 to a total write time (step 688). The performance acquiring and storing unit 505 returns to step 682 until processing all the storage devices 104 identified by identification information specified in the storage ID 160 field, acquired at step 681 (step 690) and takes another storage device 104 as an object for processing.

Upon acquiring performance information from all the storage devices 104 and writing that information into the performance history information 512, the memory monitoring unit 508 determines whether the total write time after the addition at step 688 has exceeded a preset threshold value (step 691). If having determined that the total write time does not exceed the threshold value, it terminates the process; if having determined that the total write time has exceeded the threshold value, the memory monitoring unit 508 requests the alert notification unit 509 to send an alert notification (step 692) and the alert notification unit 509 sends an alert to the manager 101 (step 693).

The threshold value at step 691 may be, for example, 50% of the interval of execution at step 680. Moreover, although an alert notification is sent based on the write time in the description with FIG. 26, no limitation to this is intended; an alert notification may be sent based on other information relevant to writing in the performance history information 512 in the memory 502 of the agent 102.

FIG. 27 is a diagram illustrating an example of a flow of a process for a request to acquire performance. This process is processing in the step 583 described with FIG. 25 and is executed in response to a request in the step 191 described with FIG. 21. The manager communication unit 506 accepts a request for information described with FIG. 13 from the manager 101 (step 780) and passes the request to the reply generating unit 507.

The reply generating unit 507 searches out a record in which both information identifying a storage device 104 and information identifying a volume 210 included in the manager request match information specified in the storage ID 151 field and information specified in the volume ID 152 field and a value in the time of recording field 150 falls within a period requested in the manager request, generates a reply from the searched out record (step 781), and passes the reply to the manager communication unit 506. The manager communication unit 506 sends the reply to the manager 101 (step 782).

As described hereinbefore, it is possible to distribute the load of acquiring performance information across a plurality of agents 102 on a per monitoring range basis and it is possible to update monitoring ranges in response to a change in the configuration of objects whose performance information is to be acquired. Additionally, since the manager 101 manages performance information stored on a plurality of agents 102, even when an agent 102 is added and the monitoring ranges are updated, it is not needed to relocate performance information stored on the agents 102. Moreover, since the manger 101 can identify an agent 102 which stores performance information required to generate a report, no load is put on other agents 102. Furthermore, by a request that is simple, as if performance information is stored on a single device, the client computer 105 can receive a report of performance information as a reply.

REFERENCE SIGNS LIST

101: Management computer (Manager),
102: Monitoring computer (Agent),
103: Computer for business purposes,
104: Storage device,
105: Client computer,
210: Volume,
313: Monitoring range history information,
512: Performance history information,
513: Monitoring range information.

The invention claimed is:

1. A storage monitoring system including a storage device, a manager, a plurality of agents, a client which sends a request for component metric information to the manager, and a server which requests the storage device to generate or delete a component and a relay device between the server and the storage device,
the storage device comprising:
   a plurality of types of components,
   the plurality of types of components including a plurality of components of a first type,
the manager comprising:
   a first processor and a first memory,
   wherein the first processor
      stores information representing a first monitoring range of the plurality of components of the first type to be monitored by a first agent out of the plurality of agents in association with information representing the first agent in the first memory and notifies the first agent of the information representing the first monitoring range;
      stores information representing a second monitoring range of the plurality of components of the first type to be monitored by a second agent out of the plurality of agents in association with information representing the second agent in the first memory and notifies the second agent of the information representing the second monitoring range;
   calculates a number of the plurality of components of the first type to be contained in the first monitoring range and a number of the plurality of components of the first type to be contained in the second monitoring range, based on a number of the plurality of components of the first type divided by a number of the plurality of agents, thus determining the information representing the first monitoring range and the information representing the second monitoring range so that the number of the plurality of components of the first type to be contained in the first monitoring range and in the second monitoring range will be even within a preset error range;
   updates information representing an end time of monitoring associated with information representing monitoring ranges already stored in the first memory;
   stores the information representing the first monitoring range and the information representing the second monitoring range, thus determined, each together with information representing a start time of monitoring, into the first memory; and
   from information representing a period consisting of a start time and an end time included in a request sent by the client, specifies agents in a group out of the plurality of agents, the agents in the group retaining pieces of component metric information that is requested for the period included in the request, based on information stored in the first memory, and sends a request to the specified agents in the group
   wherein, in response to the request sent to the agents in the group, the agents in the group send the manager the pieces of the component metric information that is requested,
   wherein the first processor of the manager receives and assembles the pieces of the component metric information and sends that information to the client, and
   wherein the first processor of the manager, when the number of the plurality of components of the first type is changed, calculates the number of the plurality of components of the first type to be contained in the first monitoring range and the number of the plurality of components of the first type to be contained in the second monitoring range, based on the changed number of the plurality of components of the first type and the number of the plurality of agents, thus determining the information representing the first monitoring range and the information representing the second monitoring range so that the number of the plurality of components of the first type will be even within a preset error range, the first agent comprising:

a second processor and a second memory, wherein the second processor stores the information representing the first monitoring range notified from the manager into the second memory, acquires, from the storage device, first component metric information on components in the first monitoring range out of the plurality of components of the first type, based on the information representing the first monitoring range stored in the second memory, and stores the acquired first component metric information into the second memory, the second agent comprising:

a third processor and a third memory, wherein the third processor stores the information representing the second monitoring range notified from the manager into the third memory, acquires, from the storage device, second component metric information on components in the second monitoring range out of the plurality of components of the first type, based on the information representing the second monitoring range stored in the third memory, and stores the acquired second component metric information into the third memory, wherein the server sends a request to generate or delete a component to the relay device, wherein the relay device receives a request to generate or delete a component and sends the request to the storage device and the manager, wherein the storage device receives a request to generate or delete a component and generates or deletes a component, and wherein the first processor of the manager receives request to generate or delete a component.

2. The storage monitoring system according to claim 1, wherein the first processor of the manager, when the number of the plurality of agents increases, calculates the number of the plurality of components of the first type to be contained in the first monitoring range and the number of the plurality of components of the first type to be contained in the second monitoring range, based on the number of the plurality of components of the first type and the increased number of the plurality of agents, thus determining the information representing the first monitoring range and the information representing the second monitoring range so that the number of the plurality of components of the first type will be even within a preset error range.

3. The storage monitoring system according to claim 1, wherein the first processor of the manager, when the first agent is deleted, calculates the number of the plurality of components of the first type to be contained in the first monitoring range and the number of the plurality of components of the first type to be contained in the second monitoring range, based on the number of the plurality of components of the first type and the number of the plurality of agents less the first agent, thus determining the information representing the second monitoring range so that the number of the plurality of components of the first type will be even within a preset error range;

directs the first agent to relocate the first component metric information stored in the second memory to a third agent out of the plurality of agents; and updates the information representing the first monitoring range stored in the first memory to that information associated with information representing the third agent, and wherein the first agent relocates the first component metric information stored in the second memory to the third agent.

4. The storage monitoring system according to claim 1, wherein the server sends a request to generate a component to the relay device, when generating a virtual machine, and sends a request to delete a component to the relay device, when deleting a virtual machine.

5. The storage monitoring system according to claim 4, wherein the second processor of the first agent measures performance of storing the first component metric information into the second memory, determines that the measured performance has become lower than a preset threshold value, and notifies the manager of that fact.

6. The storage monitoring system according to claim 5, wherein the components are volumes and the component metric information is information representing performance of read/write from/to the volumes.

7. A monitoring method for a storage monitoring system comprising a storage device, a manager, a plurality of agents, a client which sends a request for component metric information to the manager, and a server which requests the storage device to generate or delete a component and a relay device between the server and the storage device, wherein the manager stores information representing a first monitoring range of a plurality of components of a first type, out of a plurality of types of components contained in the storage device, to be monitored by a first agent out of the plurality of agents in association with information representing the first agent and notifies the first agent of the information representing the first monitoring range;

stores information representing a second monitoring range of the plurality of components of the first type to be monitored by a second agent out of the plurality of agents in association with information representing the second agent and notifies the second agent of the information representing the second monitoring range;

calculates a number of the plurality of components of the first type to be contained in the first monitoring range and a number of the plurality of components of the first type to be contained in the second monitoring range, based on a number of the plurality of components of the first type divided by a number of the plurality of agents, thus determining the information representing the first monitoring range and the information representing the second monitoring range so that the number of the plurality of components of the first type to be contained in the first monitoring range and in the second monitoring range will be even within a preset error range;

updates information representing an end time of monitoring associated with information representing monitoring ranges already stored in the first memory;

stores the information representing the first monitoring range and the information representing the second monitoring range, thus determined, each together with information representing a start time of monitoring, into the first memory; and from information representing a period consisting of a start time and an end time included in a request sent by the client, specifies agents in a group out of the plurality of agents, the agents in the group retaining pieces of component metric information that is requested for the period included in the request, based on information stored in the first memory, and sends a request to the specified agents in the group, wherein, in response to the request sent to the agents in the group, the agents in the group send the manager the pieces of the component metric information that is requested, wherein the first processor of the manager receives and assembles the pieces of the component metric information and sends that information to the client, wherein the first processor of the manager, when the number of the plurality of components of the first type is changed, calculates the number of the plurality of components of the first type to be contained in the first monitoring range and the number of the plurality of components of the first type to be contained in the second monitoring range, based on the changed number of the plurality of components of the first type and the number of the plurality of agents, thus determining the information representing the first monitoring range and the information representing the second monitoring range so that the number of the plurality of components of the first type will be even within a preset error range, wherein the server sends a request to generate or delete a component to the relay device, wherein the relay device receives a request to generate or delete a component and sends the request to the storage device and the manager, wherein the storage device receives a request to generate or delete a component and generates or deletes a component, and wherein the first processor of the manager receives request to generate or delete a component, wherein the first agent stores the information representing the first monitoring range notified from the manager, acquires, from the storage device, and stores first component metric information on components in the first monitoring range out of the plurality of components of the first type, based on the stored information representing the first monitoring range, and wherein the second agent stores the information representing the second monitoring range notified from the manager, acquires, from the storage device, and stores second component metric information on components in the second monitoring range out of the plurality of components of the first type, based on the stored information representing the second monitoring range.

\* \* \* \* \*